(12) United States Patent
Ippolito et al.

(10) Patent No.: US 11,975,984 B2
(45) Date of Patent: May 7, 2024

(54) SURFACE-TREATED MAGNESIUM HYDROXIDE-COMPRISING MATERIAL

(71) Applicant: OMYA INTERNATIONAL AG, Oftringen (CH)

(72) Inventors: Fabio Ippolito, Vordemwald (CH); Sarah Gysin, Rothrist (CH); Jamal Ftouni, Zofingen (CH)

(73) Assignee: Omya International AG, Oftringen (CH)

( * ) Notice: Subject to any disclaimer, the term of this patent is extended or adjusted under 35 U.S.C. 154(b) by 679 days.

(21) Appl. No.: 17/058,354

(22) PCT Filed: May 31, 2019

(86) PCT No.: PCT/EP2019/064206
§ 371 (c)(1),
(2) Date: Nov. 24, 2020

(87) PCT Pub. No.: WO2019/229245
PCT Pub. Date: Dec. 5, 2019

(65) Prior Publication Data
US 2021/0114891 A1  Apr. 22, 2021

(30) Foreign Application Priority Data

Jun. 1, 2018  (EP) .................................... 18175466

(51) Int. Cl.
*C01F 5/16* (2006.01)
*C09C 1/02* (2006.01)
(Continued)

(52) U.S. Cl.
CPC ................ *C01F 5/16* (2013.01); *C09C 1/028* (2013.01); *C09C 3/043* (2013.01); *C09C 3/12* (2013.01);
(Continued)

(58) Field of Classification Search
None
See application file for complete search history.

(56) References Cited

U.S. PATENT DOCUMENTS 4,828,954 A   5/1989  Hashimoto et al.

FOREIGN PATENT DOCUMENTS

CN   101679058 A   *  3/2010  ............... C01F 5/22
EP   0949305 A2   10/1999
(Continued)

OTHER PUBLICATIONS

International Search Report and Written Opinion for International Application No. PCT/EP2019/064206 (dated Sep. 6, 2019).

*Primary Examiner* — Daniel Berns
(74) *Attorney, Agent, or Firm* — Heslin Rothenberg Farley & Mesiti, P.C.

(57) ABSTRACT

The present invention refers to a process for the preparation of a surface-treated magnesium hydroxide-comprising material, a surface-treated magnesium hydroxide-comprising material as well as the use of the surface-treated magnesium hydroxide-comprising material in polymer composition, in paper making, paper coatings, agricultural applications, paints, adhesives, sealants, composite materials, wood composite materials, construction applications, pharma applications and/or cosmetic applications as well as surrounding materials, wherein the surface treatment agent of the surface-treated magnesium hydroxide-comprising material is undergoing a reaction with the surrounding material.

15 Claims, 6 Drawing Sheets

BET values (m²/g) of the magnesium carbonate-comprising material before and after calcining at different thermal treatment temperatures (°C) between 100 °C and 900 °C. The value at "0" mean that this sample is a freshly prepared sample at room temperature.

(51) Int. Cl.
*C09C 3/04* (2006.01)
*C09C 3/12* (2006.01)
(52) U.S. Cl.
CPC ...... *C01P 2004/61* (2013.01); *C01P 2006/12* (2013.01)

(56) References Cited

FOREIGN PATENT DOCUMENTS

| EP | 2420221 | A1 | | 2/2012 | |
|---|---|---|---|---|---|
| JP | 2004331705 | A | * | 11/2004 | ........... C09D 201/00 |
| WO | 2010004341 | A1 | | 1/2010 | |
| WO | 2017121763 | A1 | | 7/2017 | |

* cited by examiner

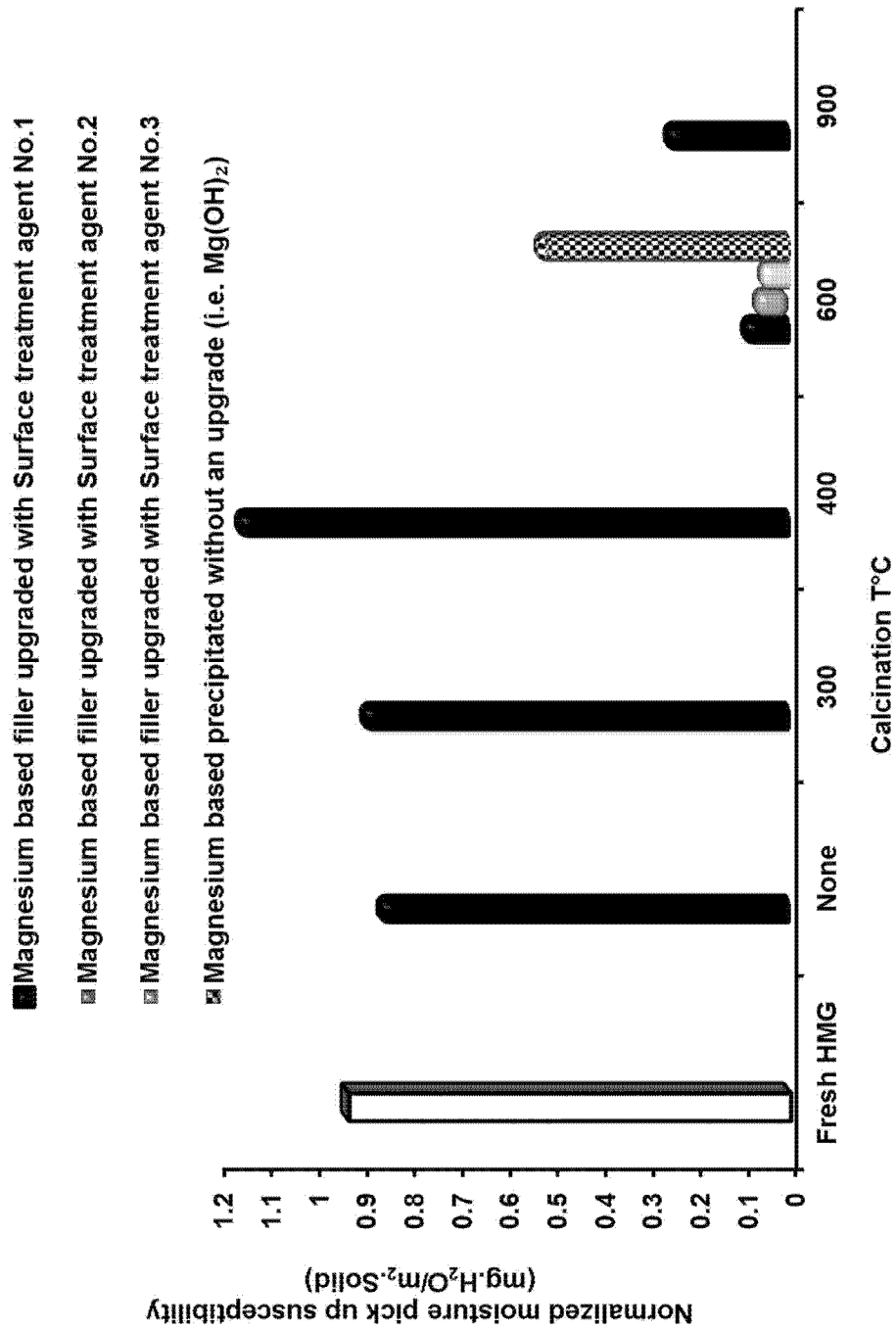
Figure 1 Evaluation of the 'Normalized moisture pick up susceptibility' in function of the thermally treated and hydrophobized hydromagnesite, using Surface treatment agents No.1, No.2 or No.3

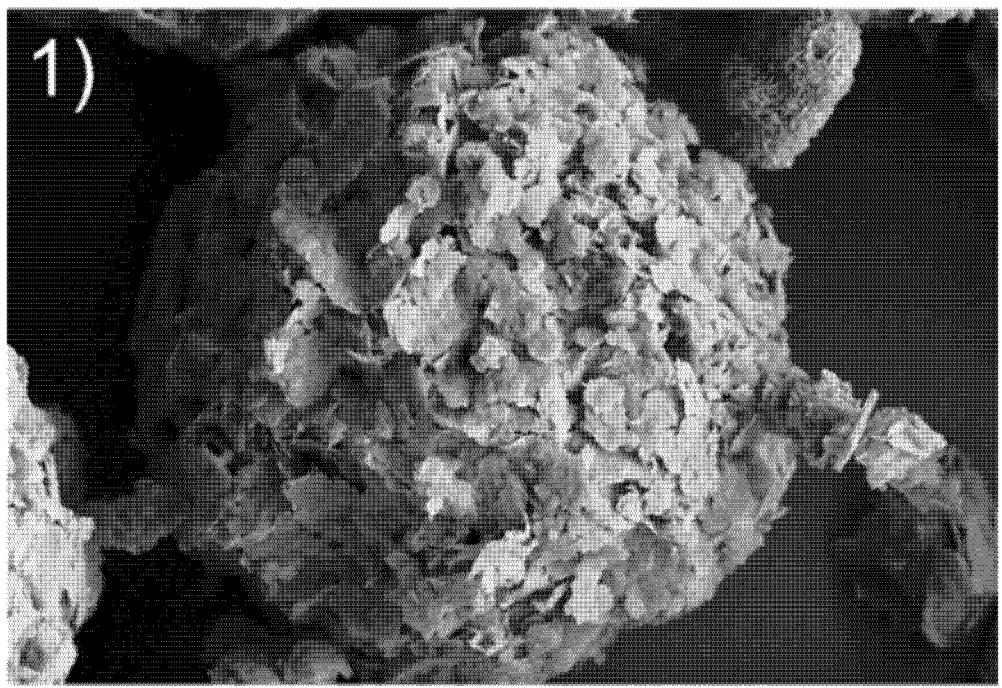
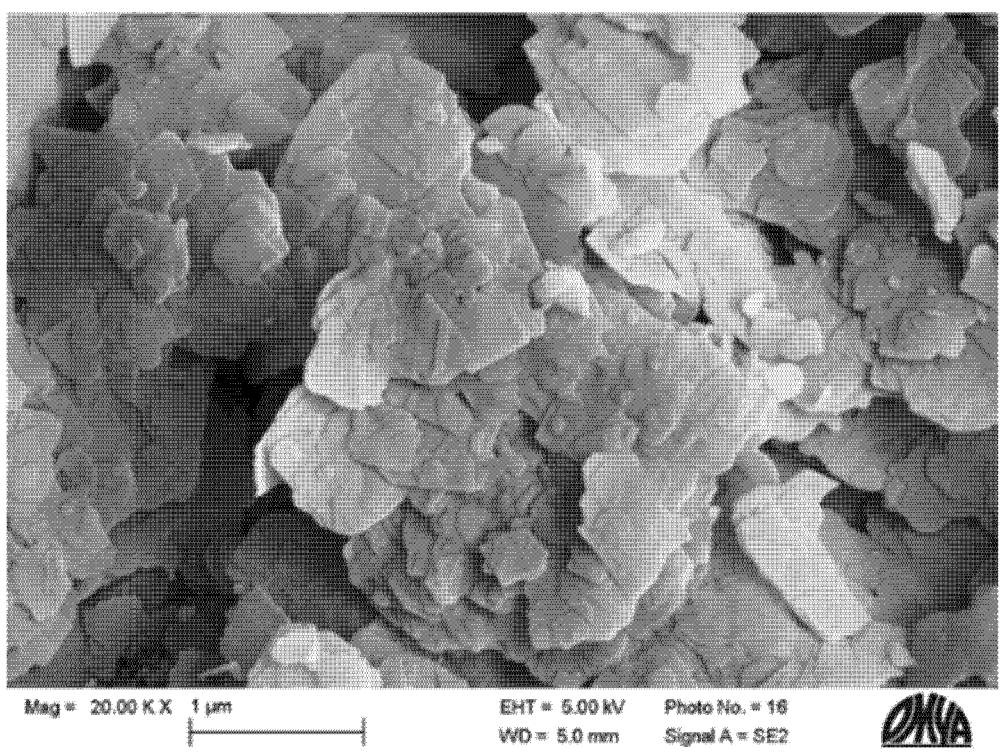
Figure 2 SEM pictures of 1) Fresh hydromagnesite without surface treatment agent

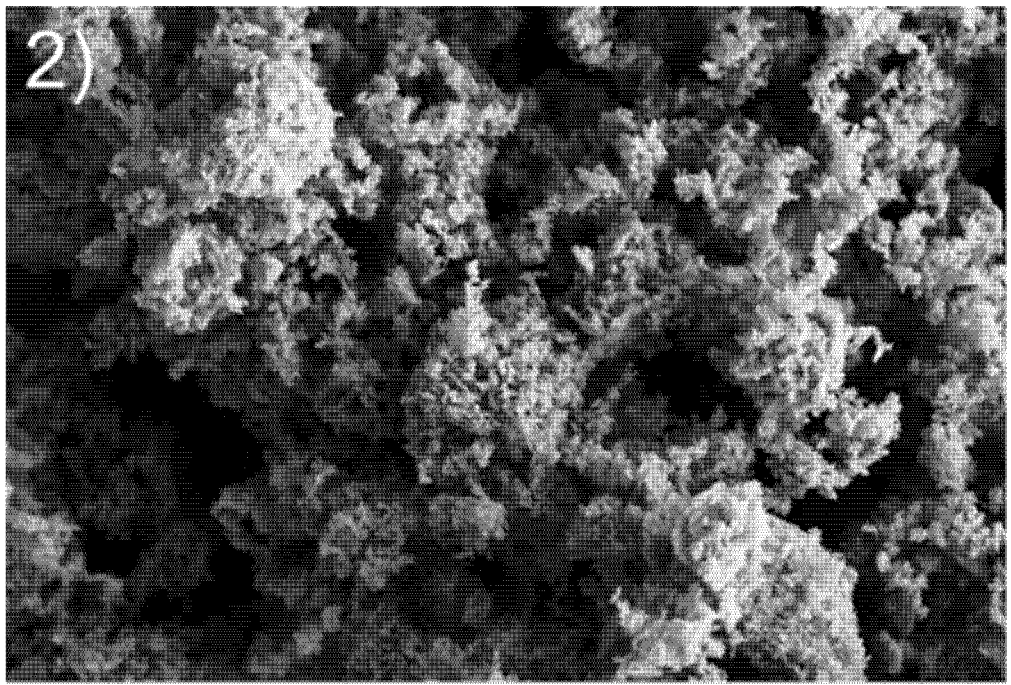
Figure 3 SEM pictures of 2) surface-treated magnesium hydroxide comprising material treated with surface treatment agent No.1

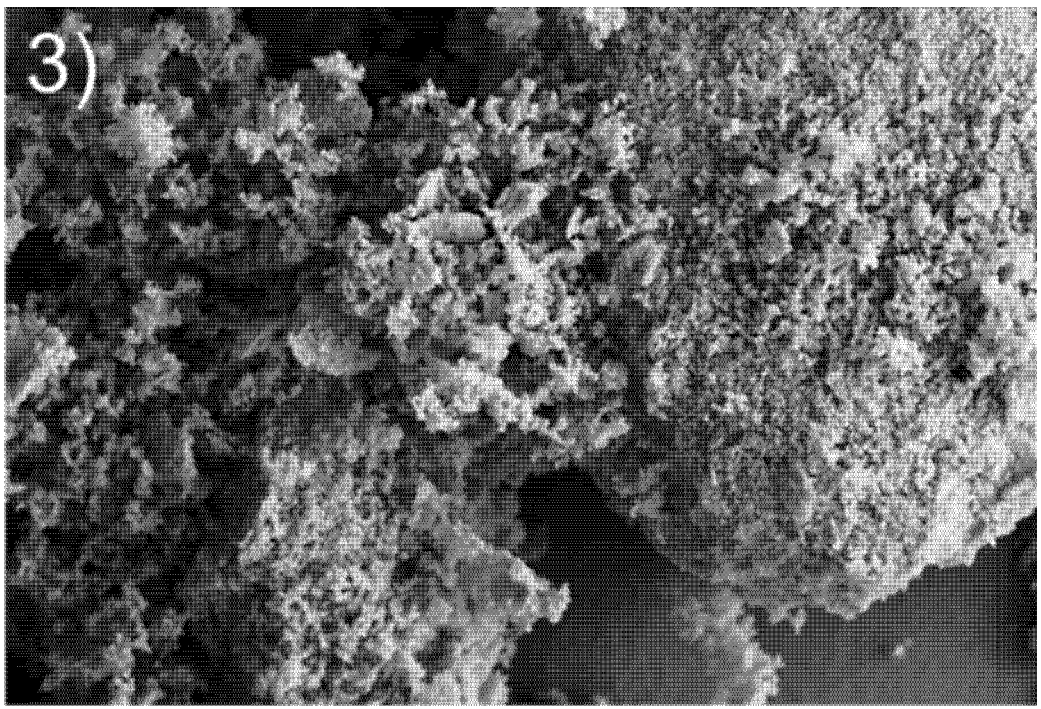
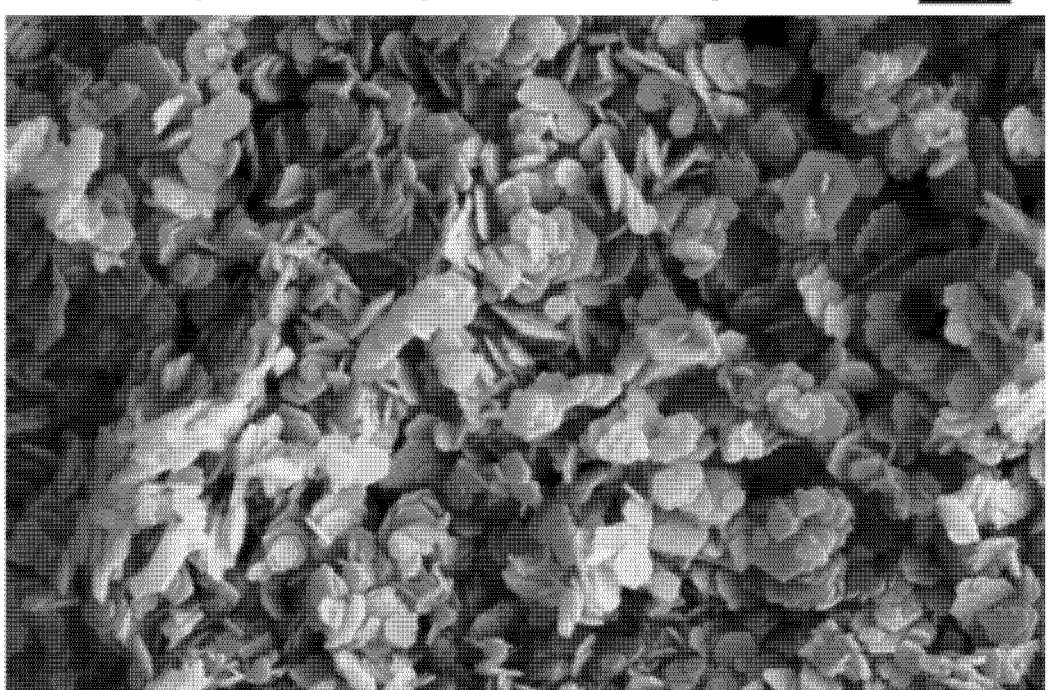
Figure 4 SEM pictures of 3) surface-treated magnesium hydroxide comprising material treated with surface treatment agent No.2

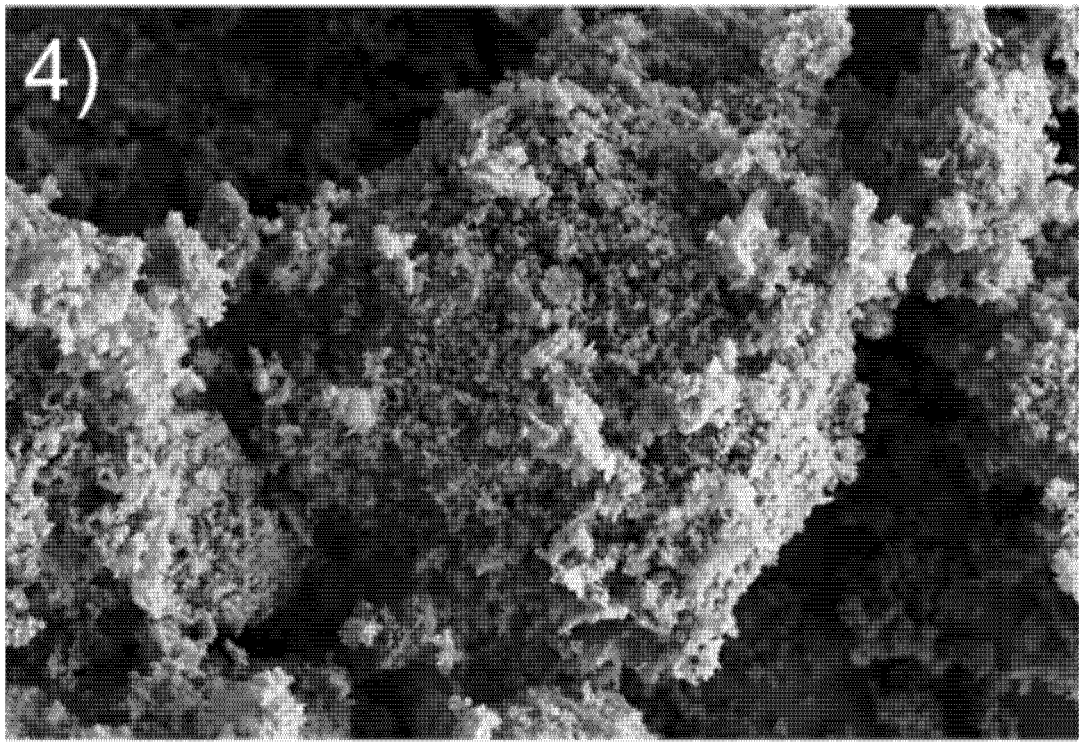
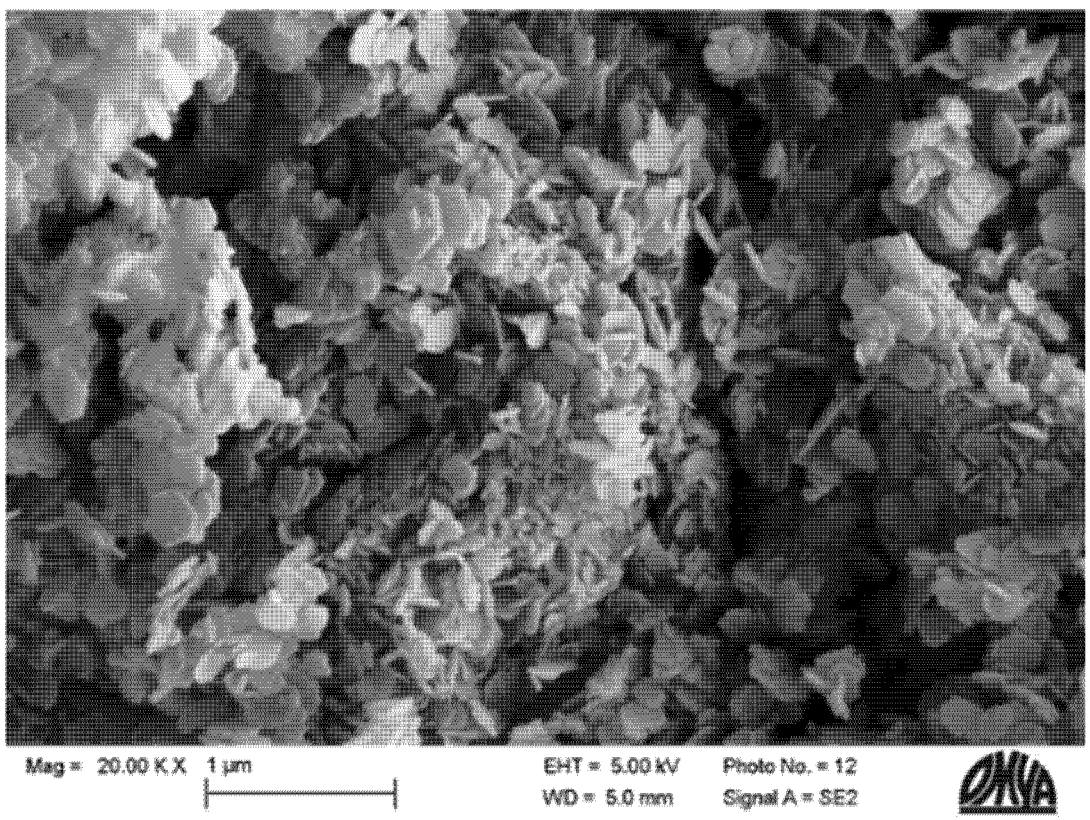
Figure 5 SEM pictures of 4) surface-treated magnesium hydroxide comprising material treated with surface treatment agent No.3

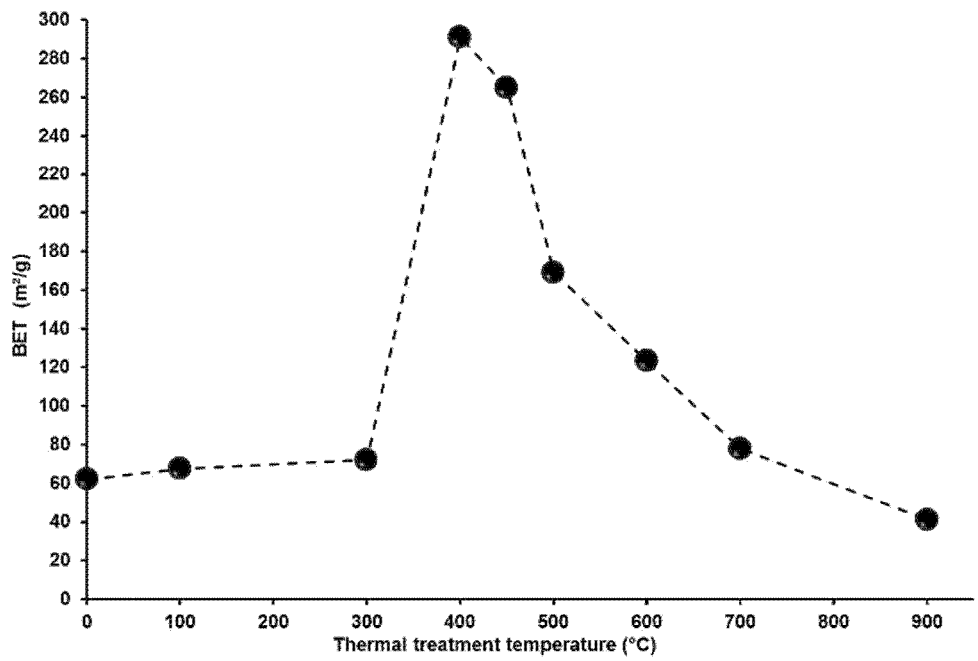

Figure 6 BET values (m²/g) of the magnesium carbonate-comprising material before and after calcining at different thermal treatment temperatures (°C) between 100 °C and 900 °C. The value at "0" mean that this sample is a freshly prepared sample at room temperature.

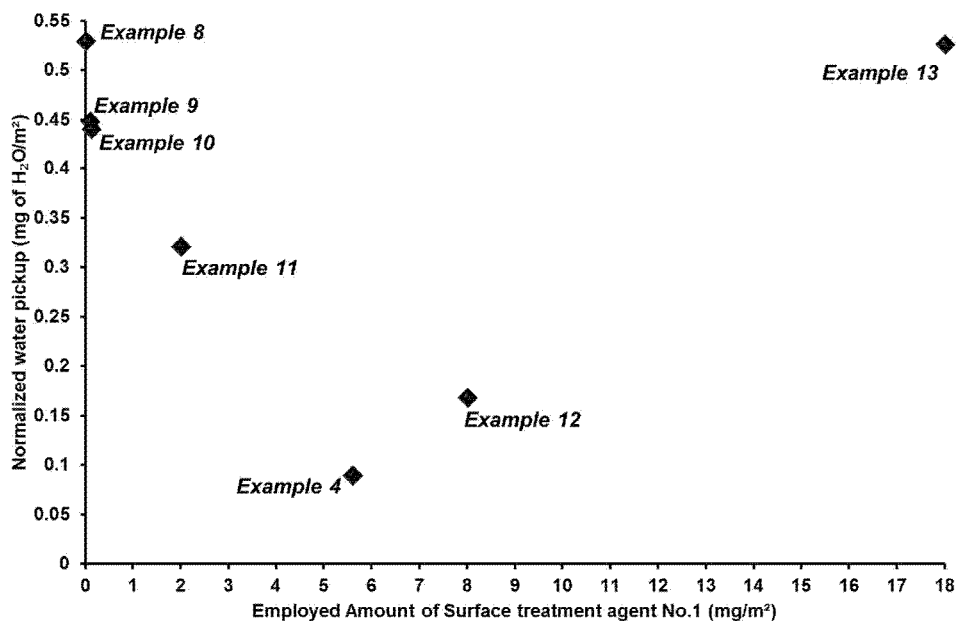

Figure 7 Correlation of the employed amount of surface treatment agent vs. the normalized water pickup in examples 8 to 13

SURFACE-TREATED MAGNESIUM HYDROXIDE-COMPRISING MATERIAL

CROSS REFERENCE TO RELATED APPLICATIONS

This application is a national stage application under 35 U.S.C. § 371 of International Application No. PCT/EP2019/064206, filed on May 31, 2019, which claims priority of European Application No. 18175466.4, filed on Jun. 1, 2018, which are hereby incorporated by reference in their entirety.

The present invention refers to a process for the preparation of a surface-treated magnesium hydroxide-comprising material, a surface-treated magnesium hydroxide-comprising material as well as the use of the surface-treated magnesium hydroxide-comprising material in polymer composition, in paper making, paper coatings, agricultural applications, paints, adhesives, sealants, composite materials, wood composite materials, construction applications, pharma applications and/or cosmetic applications as well as surrounding materials, wherein the surface treatment agent of the surface-treated magnesium hydroxide-comprising material is undergoing a reaction with the surrounding material.

Especially in the field of polymer compositions, in paper making, paper coatings, agricultural applications, paints, adhesives, sealants, composite materials, wood composite materials, construction applications, pharma applications and/or cosmetic applications the use of filler materials and especially a surface-treated magnesium hydroxide-comprising material is highly desirable. Generally, these surface-treated magnesium hydroxide-comprising materials may provide improved properties, especially improved hydrophobicity, improved dispersibility of said filler material in the polymer compositions, papers, coatings, paints etc. or improved processability of these compositions and/or improved properties of the final products, in comparison to products using untreated fillers.

Various processes are known for producing surface-treated filler materials and especially surface-treated magnesium hydroxide-comprising materials.

EP 1 967 553 A1 refers to a water-repellent inorganic powder and a process for the production thereof. The process comprises a first step of adding to an inorganic powder an aqueous emulsion of a silicone compound having a group reactive with the inorganic powder, followed by mixing and stirring in a substantially dried state for surface-treating the inorganic powder, and a second step of heating the treated inorganic powder to bake the silicon compound to the surface of the inorganic powder and at the same time, separating the aqueous medium of the aqueous emulsion. According to EP 1 967 553 A1 the inorganic powder can be magnesium hydroxide.

EP 0172 693 A2 refers to a surface-treated particulate filler, to the surface of which there is bound an acid group-containing organic polymer which also comprises a nitrogen-containing group capable of reacting with an organic polymeric material. The acidic group may be a carboxylic acid group and the nitrogen-containing group may be an amide group or an amine group, especially an alkylamine or a polyakylamine derivative of an amine group. The particulate filler may be, for example, magnesium oxide, magnesium hydroxide or magnesium carbonate amongst others.

EP 1 146 075 A1 refers to a method for producing surface-modified fillers like magnesium hydroxide or magnesium oxide by spray-drying an aqueous suspension of a filler that consists of fine particles, whereby 0.1 to 50 wt. % (calculated as dry substance) of an aqueous dispersion of a thermoplastic polymer or copolymer or a caoutchouc are added.

WO 2017/121763 A1 relates to a process for the surface-treatment of a calcium carbonate-comprising material, to a surface-treated calcium carbonate-comprising material obtained by such a process and the use of such a surface-treated calcium carbonate-comprising material. The surface-treatment material is an alkoxysilane treatment agent that comprises hydrolysable alkoxy groups attached to a silane radical.

However, it is not only important that the surface-treated magnesium hydroxide-comprising material can be processed in a cheap, simple and time-efficient manner but also that the obtained surface-treated magnesium hydroxide-comprising material shows improved properties compared to neat magnesium hydroxide-containing material or to magnesium hydroxide-containing materials prepared by another process. The surface properties, for example hydrophobicity, are the better the more of the surface area of the magnesium hydroxide is coated with a hydrophobic surface treatment agent. Generally, it is desirable that the surface-treated magnesium hydroxide-comprising material has a large surface area. A large surface area is important due to the fact that only the surface of the filler interacts with the surrounding material, for example, the polymer or the paper, or the paint/coating and, therefore, the larger the surface area of the filler, the less filler may be used in the composition, which is preferred due to ecologic and economic reasons. Furthermore, a large surface area has a large interaction are with the surrounding material and, therefore, the interaction with the surrounding material may be improved.

Furthermore, also a low moisture pickup susceptibility is important or desirable, due to the fact that as less water as possible should be incorporated in the final product, for example the polymer composition, the paper composition, the coatings and paintings etc. by the filler. The processability of the final product can be significantly improved by minimizing the amount of water added by the filler to the composition. Also the resulting products may have improved properties.

However, by the processes of the prior art it was possible to optimize either the surface area or the moisture pick up susceptibility. In other words, either the connection to the surrounding material has been improved by the approaches known in the art or the processability of the final product by providing a reduced moisture content. However, efficient manufacturing methods for preparing improved surface-treated magnesium hydroxide-comprising materials with a large surface area in combination with a low moisture pick up susceptibility are not known.

Thus, there is a need for providing a process which addresses the foregoing technical problems and especially allows for improving the surface characteristics of a resulting surface-treated magnesium hydroxide-comprising material, while at the same time providing a low moisture pickup susceptibility.

Accordingly, it is an objective of the present invention to provide a process for preparing a surface-treated magnesium hydroxide-comprising material having improved surface characteristics, and especially a high hydrophobicity. A further objective is to provide a process for preparing a surface-treated magnesium hydroxide-comprising material featuring a low moisture pick up susceptibility and a high surface area. Another objective of the present invention is to provide a process which can be carried out in a simple way. Further objectives can be gathered from the following description of the invention.

The foregoing and other objectives are solved by the subject-matter as defined herein in claim 1.

According to one aspect of the present invention a process for the preparation of a surface-treated magnesium hydroxide-comprising material is provided, the process comprising the steps of:
a) providing at least one magnesium carbonate-comprising material,
b) calcining the at least one magnesium carbonate-comprising material of step a) at a temperature in the range between 450 to 750 éC to obtain a magnesium oxide-comprising material,
c) slaking the magnesium oxide-comprising material of step b) to obtain a magnesium hydroxide-comprising material,
d) adding at least one surface-treatment agent to the aqueous suspension obtained in step c) in an amount ranging from 0.05 to 10 mg surface treatment agent per $m^2$ of the specific surface area of the at least one magnesium oxide-comprising material as obtained in step b), wherein the specific surface area (BET) is measured using nitrogen and the BET method according to ISO 9277:2010 and wherein the at least one surface treatment agent is a compound according to Formula (I),

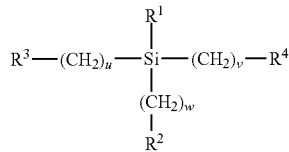

Formula (I)

wherein $R^1$ is a hydrolysable alkoxy group, and $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group, a benzoyl group and a fully or partially halogenated alkyl group having from 1 to 20 carbon atoms, and u, v and w are independently from each other an integer from 0 to 24, and
e) drying the aqueous suspension during or after step d) at ambient or reduced pressure until the moisture content of the obtained surface-treated magnesium hydroxide-comprising material is in the range from 0.001 to 20 wt.-%, based on the total weight of the surface-treated magnesium hydroxide-comprising material.

The inventors surprisingly found out that by the foregoing process it is possible to prepare surface-treated magnesium hydroxide-comprising materials having improved surface characteristics, like a high hydrophobicity or the ability to react with surrounding materials. Furthermore, by the process according to the present invention a surface-treated magnesium hydroxide-comprising material with a large surface area in combination with a low moisture pick up susceptibility is provided, compared to surface-treated magnesium hydroxide-comprising materials prepared by conventional processes. Furthermore, the process according to the present invention can be carried out in a simple way.

According to another aspect of the present invention a surface-treated magnesium hydroxide-comprising material is provided, having a specific surface area (BET) of from 15 to 150 $m^2/g$ as measured using nitrogen and the BET method according to ISO 9277:2010 and a moisture pick-up susceptibility of from 0.1 to 10 mg/g, wherein the magnesium hydroxide-comprising material has been treated with at least one surface treatment agent that is a compound according to Formula (I),

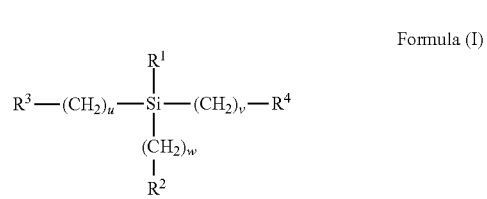

Formula (I)

wherein $R^1$ is a hydrolysable alkoxy group, and $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group, a benzoyl group and a fully or partially halogenated alkyl group having from 1 to 20 carbon atoms, and u, v and w are independently from each other an integer from 0 to 24.

According to another aspect of the present invention the surface-treated magnesium hydroxide-comprising material according to the present invention may be used in a polymer composition, in paper making, paper coatings, agricultural applications, paints, adhesives, sealants, composite materials, wood composite materials, construction applications, pharma applications and/or cosmetic applications.

The inventors also found that the surface-treated magnesium hydroxide-comprising material obtained by the process according to the present invention provides improved surface characteristics, like a high hydrophobicity or the ability to react with surrounding materials. Furthermore, the surface-treated magnesium hydroxide-comprising material has a large surface area in combination with a low moisture pick up susceptibility compared to conventional surface-treated magnesium hydroxide-comprising materials.

Advantageous embodiments of the present invention are defined in the corresponding sub-claims.

When in the following reference is made to specific or preferred embodiments of the process, it is also to be understood that these embodiments are also taught and disclosed in relation to the inventive product, the inventive use and vice versa.

According to one embodiment of the process of the present invention, the amount of magnesium carbonate in the magnesium carbonate-comprising material of step a) is from 80.0 to 99.9 wt.-%, based on the dry weight of the magnesium carbonate-comprising material, preferably from 90.0 to 99.5 wt.-%, more preferably from 95.0 to 99.3 wt.-% and most preferably from 98.0 to 99.0 wt.-%, based on the dry weight of the magnesium carbonate-comprising material.

According to another embodiment of the process of the present invention, the magnesium carbonate-comprising material has
i) a weight median particle size $d_{50}$ value in the range from 0.1 µm to 20 µm, preferably in the range from 0.25 µm to 15 µm, more preferably in the range from 0.5 µm to 10 µm and most preferably in the range from 1 µm to 6 µm and/or
ii) a top cut ($d_{98}$) of ≤50 µm, preferably of ≤30 µm, more preferably of ≤20 µm and most preferably of ≤15 µm and/or
iii) a specific surface area (BET) of from 0.5 to 150 m²/g as measured using nitrogen and the BET method according to ISO 9277:2010, preferably from 1 to 80 m²/g, and more preferably from 40 to 70 m²/g and/or
iv) a moisture pick-up susceptibility of from 35 to 80 mg/g, preferably from 40 to 70 mg/g, and more preferably from 50 to 60 mg/g.

According to another embodiment of the process of the present invention, the calcination step b) is carried out at a temperature in the range between 500 to 700 éC, and preferably at a temperature in the range between 550 to 650 éC.

According to another embodiment of the process of the present invention, $R^1$, $R^2$, $R^3$ and/or $R^4$ are independently from each other a methoxy or an ethoxy group, and/or the at least one surface-treatment agent is selected from triethoxysilane and/or trimethoxysilane and preferably is selected from the group consisting of triethoxyvinylsilane, trimethoxyvinylsilane, 3-(2,3-epoxypropoxy)propyltrimethoxysilane, triethoxysilylpropyltetrasulphide, 3-mercaptopropyltrimethoxysilane, 3-methacryloxypropyltrimethoxysilane, 3-aminopropyltriethoxysilane, methyltriethoxysilane, 3-glycidoxypropyltrimethoxysilane, dodecyltriethoxysilane, n-octadecyltriethoxysilane, phenyltriethoxysilane, 3-butenyltriethoxysilane, 1H,1H,2H,2H-perfluorodecyltriethoxysilane, 1H,1H,2H,2H-perfluorooctyltriethoxysilane and combinations thereof and most preferably is triethoxyvinylsilane, trimethoxyvinylsilane, n-octadecyltriethoxysilane,1H,1H,2H,2H-perfluorodecyltriethoxysilane, 1H,1H,2H,2H-perfluorooctyltriethoxysilane and combinations thereof.

According to another embodiment of the process of the present invention, the amount of the at least one surface-treatment agent added in step d) is in the range from 0.01 to 9 mg surface-treatment agent per m² of the surface area of the at least one magnesium oxide-comprising material as obtained in step b), preferably in the range from 0.1 to 8 mg surface-treatment agent per m² of the surface area of the at least one magnesium oxide-comprising material as obtained in step b) and most preferably in the range from 0.11 to 6 mg surface-treatment agent per m² of the surface area of the at least one magnesium oxide-comprising material as obtained in step b).

According to another embodiment of the process of the present invention, step e) is carried out at a temperature in the range from 20 to 200 éC, preferably from 40 to 160 éC, more preferably in the range from 50 to 155 éC, even more preferably from 70 to 150 éC and most preferably from 80 to 110 éC.

According to another embodiment of the process of the present invention step e) is carried out until the moisture content of the obtained surface-treated magnesium hydroxide-comprising material is in the range from 0.005 to 15 wt.-%, preferably in the range from 0.01 to 10 wt.-% more preferably from 0.05 to 5 wt.-%, and most preferably from 0.06 to 1 wt.-%, based on the total weight of the surface-treated magnesium hydroxide-comprising material.

According to another embodiment of the process of the present invention, mechanical dewatering, preferably by centrifugation or filtration, is carried out before and/or during step e), and/or the surface-treated magnesium hydroxide-comprising material is washed with water during and/or after step d).

According to another embodiment of the process of the present invention, the process comprises a further step g) after or during step e) of deagglomerating the surface-treated magnesium hydroxide-comprising material of step d) or e), and preferably step g) is carried out after step e).

According to another embodiment of the process of the present invention. the surface-treated magnesium hydroxide-comprising material obtained in step e) has
i) a weight median particle size $d_{50}$ value in the range from 0.1 µm to 20 µm, preferably in the range from 0.25 µm to 15 µm, more preferably in the range from 0.5 µm to 10 µm and most preferably in the range from 1 µm to 6 µm and/or
ii) a top cut ($d_{98}$) of ≤50 µm, preferably of ≤30 µm, more preferably of ≤20 µm and most preferably of ≤15 µm and/or
iii) a specific surface area (BET) of from 15 to 150 m²/g as measured using nitrogen and the BET method according to ISO 9277:2010, preferably from 20 to 80 m²/g, and more preferably from 30 to 70 m²/g and/or
iv) a moisture pick-up susceptibility of from 0.1 to 10 mg/g, preferably from 0.5 to 7 mg/g, and more preferably from 1 to 5 mg/g.

According to another embodiment of the process of the present invention, the magnesium carbonate-comprising material of step a) is selected from the group consisting of magnesium carbonate hydrate ($MgCO_3*xH_2O$), non-hydrated magnesium carbonate ($MgCO_3$), magnesium carbonate hydroxide hydrate (($MgCO_3)_z*Mg(OH)_2*xH_2O$), and non-hydrated magnesium carbonate hydroxide (($MgCO_3)_z*Mg(OH)_2$), preferably is selected from the group consisting of magnesite, barringtonite, nesquehonite, hydromagnesite and mixtures thereof and most preferably the magnesium carbonate-comprising material is hydromagnesite.

According to another embodiment of the product of the present invention, the surface-treated magnesium hydroxide-comprising material has a moisture pick-up susceptibility to specific surface area (BET) ratio of 0.001 to 0.5 mg/m Д preferably from 0.005 to 0.4 mg/m Д even more preferably from 0.01 to 0.15 mg/m Д and most preferably from 0.06 to 0.09 mg/m Д

According to another embodiment of the present invention, the surface-treated magnesium hydroxide-comprising material is used in a surrounding material, wherein the surface treatment agent of the surface-treated magnesium hydroxide-comprising material is undergoing a reaction with the surrounding material upon addition of the surface-treated magnesium hydroxide-comprising material into the surrounding material, wherein the surrounding material is preferably a polymer formulation and most preferably a polyolefin formulation, a polyvinylchloride formulation or a polyester formulation and/or the reaction is preferably a crosslinking reaction.

It should be understood that for the purposes of the present invention, the following terms have the following meanings:

A 'magnesium hydroxide-comprising material' in the meaning of the present invention refers to a material which comprises magnesium hydroxide which has the chemical sum formula $Mg(OH)_2$.

A 'magnesium carbonate-comprising material' in the meaning of the present invention refers to a material which comprises magnesium carbonate which has the chemical sum formula $MgCO_3$.

A 'magnesium oxide-comprising material' in the meaning of the present invention refers to a material which comprises magnesium oxide which has the chemical sum formula $MgO$.

The term 'slaking' or 'slake' in the meaning of the present invention refers to the hydration of magnesium oxide by contacting said compounds with water or moisture.

The term 'calcining' in the meaning of the present invention refers to a thermal treatment process applied to solid materials causing loss of moisture, reduction or oxidation, and the decomposition of carbonates and other compounds resulting in an oxide of the corresponding solid material.

The term 'dry' or 'dried' material is understood to be a material having between 0.001 to 20 wt.-% of water, based on the total weight of the surface-treated magnesium hydroxide-comprising material weight. The % water (equal to 'moisture content') is determined gravimetrically as the weight loss upon heating to 150 éC. 'Drying' in the sense of the present invention means that heating is carried out until the moisture content of the surface-treated magnesium hydroxide-comprising material is in the range from 0.001 to 20% by weight, based on the total weight of the surface-treated magnesium hydroxide-comprising material weight.

The term 'moisture pickup susceptibility' of a material refers to the amount of moisture absorbed on the surface of said material within a certain time upon exposure to a defined humid atmosphere and is expressed in mg/g. The 'normalized moisture pickup susceptibility' also known as the ratio of the moisture pick-up susceptibility to the specific surface area (BET) of a material refers to the amount of moisture absorbed on the surface of said material within a certain time upon exposure to a defined humid atmosphere and is expressed in mg/m$_Д$ Measuring methods for the moisture pickup susceptibility and the normalized moisture pickup susceptibility are described in the experimental section.

The 'particle size' of particulate materials herein is described by its distribution of particle sizes $d_x$. Therein, the value $d_x$ represents the diameter relative to which x % by weight of the particles have diameters less than $d_x$. T his means that, for example, the $d_{20}$ value is the particle size at which 20 wt.-% of all particles are smaller than that particle size. The $d_{50}$ value is thus the weight median particle size, i.e. 50 wt.-% of all grains are bigger and the remaining 50 wt.-% are smaller than this particle size.

For the purpose of the present invention the particle size is specified as weight median particle size $d_{50}$ unless indicated otherwise. The $d_{98}$ value is the particle size at which 98 wt.-% of all particles are smaller than that particle size. Particle sizes were determined by using a Malvern Mastersizer 3000 Laser Diffraction System.

The raw data obtained by the measurement are analysed using the Mie theory, with a defined RI (particle refractive index) of 1.57 and iRI (absorption index) of 0.005 and Malvern Application Software 5.60. The measurement was performed with an aqueous dispersion containing 0.1 wt.-% of tetrasodium diphosphate, based on the total weight of the aqueous dispersion. For this purpose, the samples were dispersed using a high-speed stirrer. The weight determined particle size distribution may correspond to the volume determined particle size if the density of all the particles is equal.

A 'specific surface area (SSA)' of a particulate material in the meaning of the present invention is defined as the surface area of the magnesium carbonate-comprising material/surface-treated magnesium hydroxide-comprising material/magnesium oxide-comprising material divided by its mass. Throughout the present document, the specific surface area (in m$^2$/g) is determined using the BET method (using nitrogen as adsorbing gas), which is well known to the skilled man (ISO 9277:2010). The total surface area (in m$^2$) of the filler material is then obtained by multiplication of the specific surface area and the mass (in g) of the corresponding sample.

The term 'surface area' or 'outer surface' in the meaning of the present invention refers to the surface of the magnesium carbonate-comprising material particle/magnesium hydroxide-comprising material particle/magnesium oxide-comprising material particle that is accessible for nitrogen as used for measuring the BET according to ISO 9277:2010. In this regard, it should be noted that the amount of surface-treatment agent according to claim 1 required for full saturation of the surface area is defined as a monolayer concentration. Higher concentrations thus can be chosen by forming bilayered or multi-layered structures on the surface of the magnesium hydroxide-comprising material particle.

A 'suspension' or 'slurry' in the meaning of the present invention comprises insoluble solids and a solvent or liquid, preferably water, and optionally further additives, and usually contains large amounts of solids and, thus, is more viscous and can be of higher density than the liquid from which it is formed.

The term 'surface-treatment agent' according to the present invention is an agent that is used to treat the surface of the at least one magnesium hydroxide-comprising material. The surface-treatment agent of the present invention is a silane agent that comprises at least one hydrolysable alkoxy group attached to the Si atom. The 'hydrolysable alkoxy group' attached to the Si atom according to the present invention hydrolyses readily with water to form a silanol Si—OH group.

A 'surface-treated magnesium hydroxide-comprising material' in the gist of the present invention comprises at least a magnesium hydroxide-comprising material which has been contacted with at least one surface-treatment agent according to the present invention such as to obtain a treatment layer located on at least apart of the surface of the magnesium hydroxide-comprising material. Accordingly, the term 'treatment layer' refers to a layer comprising the surface treatment agent and reaction products thereof on at least a part of the surface of the magnesium hydroxide-comprising material. The term 'reaction products' in the meaning of the present invention refers to products obtained by contacting the at least one magnesium hydroxide-comprising material with at least one surface-treatment agent according to the present invention.

The term 'base' according to the present invention refers to abase as defined by the Brηnsted-Lowry theory. Therefore, abase in the meaning of the present invention is a substance that can accept hydrogen ions (H$^+$)' otherwise known as protons.

The term 'surrounding material' in the meaning of the present invention refers to a matrix material that comprises the surface-treated magnesium hydroxide-comprising material as filler.

A 'crosslinking reaction' according to the present invention is defined as a reaction between the surrounding material and the surface-treatment agent that is located on the surface of the surface-treated magnesium hydroxide-comprising material. Due to this reaction a bond is created between the surrounding material and the surface-treatment agent that is located on the surface of the surface-treated magnesium hydroxide-comprising material, wherein the bond is a chemical bond or an ionic bond.

The 'hydrophobicity' of the surface-treated magnesium hydroxide-comprising material is evaluated at +23 °C (± 2 °C) by determining the minimum water to ethanol ratio in a volume/volume based water/ethanol-mixture needed for the settling 50 wt.-% of said surface-treated magnesium hydroxide-comprising material, where said material is deposited on the surface of said water ethanol-mixture by passage through a house hold tea sieve. The volume/volume base is related to the volumes of both separate liquids before blending them together and do not include the volume contraction of the blend.

The term 'solid' according to the present invention refers to a material that is solid under standard ambient temperature and pressure (SATP) which refers to a temperature of 298.15 K (25 °C) and an absolute pressure of exactly 100 000 Pa (1 bar, 14.5 psi, 0.98692 atm). The solid may be in the form of a powder, tablet, granules, flakes etc.

The term 'liquid' according to the present invention refers to a material that is liquid under standard ambient temperature and pressure (SATP) which refers to a temperature of 298.15 K (25 °C) and an absolute pressure of exactly 100 000 Pa (1 bar, 14.5 psi, 0.98692 atm). It is to be noted that the liquid may be a neat liquid or a solution which further comprises a solvent, preferably water. The liquid may also comprise insoluble solids and thus may form a suspension or dispersion.

The term 'gas' according to the present invention refers to a material that is gaseous under standard ambient temperature and pressure (SATP) which refers to a temperature of 298.15 K (25 °C) and an absolute pressure of exactly 100 000 Pa (1 bar, 14.5 psi, 0.98692 atm).

The term 'ambient pressure' according to the present invention refers to the standard ambient temperature pressure (SATP) which refers to an absolute pressure of exactly 100 000 Pa (1 bar, 14.5 psi, 0.98692 atm). The term 'reduced pressure' refers to a pressure below the 'ambient pressure'.

Where the term 'comprising' is used in the present description and claims, it does not exclude other non-specified elements of major or minor functional importance. For the purposes of the present invention, the term 'consisting of' is considered to be a preferred embodiment of the term 'comprising of'. If hereinafter a group is defined to comprise at least a certain number of embodiments, this is also to be understood to disclose a group, which preferably consists only of these embodiments.

Whenever the terms 'including' or 'having' are used, these terms are meant to be equivalent to 'comprising' as defined above.

Where an indefinite or definite article is used when referring to a singular noun, e.g. 'a', 'an' or 'the', this includes a plural of that noun unless something else is specifically stated.

Terms like 'obtainable' or 'definable' and 'obtained' or 'defined' are used interchangeably. This e.g. means that, unless the context clearly dictates otherwise, the term 'obtained' does not mean to indicate that e.g. an embodiment must be obtained by e.g. the sequence of steps following the term 'obtained' even though such a limited understanding is always included by the terms 'obtained' or 'defined' as a preferred embodiment.

As set out above, the inventive process for preparing a surface-treated magnesium hydroxide-comprising material comprises at least the process steps of a), b), c), d) and e). In the following, it is referred to further details of the present invention and especially the foregoing steps of the inventive process for preparing a surface-treated magnesium hydroxide-comprising material.

Characterisation of Step a): Providing of at Least One Magnesium Carbonate-Comprising Material According to step a) of the present invention at least one magnesium carbonate-comprising material is provided.

The expression 'at least one' magnesium carbonate-comprising material means that one or more, for example two or three magnesium carbonate-comprising materials may be provided in step a). According to a preferred embodiment of the present invention only one magnesium carbonate-comprising material is provided in step a).

A 'magnesium carbonate-comprising material' in the meaning of the present invention refers to a material which comprises magnesium carbonate which has the chemical sum formula $MgCO_3$.

It is appreciated that the magnesium carbonate-comprising material comprises at least 50 wt.-% magnesium carbonate, based on the total dry weight of the magnesium carbonate-comprising material, more preferably at least 60 wt.-% and most preferably at least 70 wt.-%, based on the total dry weight of the magnesium carbonate-comprising material.

According to one embodiment of the present invention, the amount of magnesium carbonate in the magnesium carbonate-comprising material is from 80.0 to 99.9 wt.-%, based on the total dry weight of the magnesium carbonate-comprising material, preferably from 90.0 to 99.5 wt.-%, more preferably from 95 to 99.3 wt.-%, and most preferably from 98.0 to 99.0 wt.-%, based on the total dry weight of the magnesium carbonate-comprising material.

Thus, it is to be noted that the magnesium carbonate-comprising material may further comprise impurities typically associated with the type of material used. For example, the magnesium carbonate-comprising material may further comprise impurities such as magnesium hydroxide, calcium hydroxide, calcium carbonate and mixtures thereof. However, it is appreciated that such impurities are present in amounts of less than 50 wt.-%, preferably less than 40 wt.-% and most preferably less than 30 wt.-%, based on the total dry weight of the magnesium carbonate-comprising material. According to one embodiment of the present invention, the amount of impurities in the magnesium carbonate-comprising material is from 20.0 to 0.1 wt.-%, based on the total dry weight of the magnesium carbonate-comprising material, preferably from 10.0 to 0.5 wt.-%, more preferably from 5 to 0.7 wt.-%, and most preferably from 2.0 to 1.0 wt.-%, based on the total dry weight of the magnesium carbonate-comprising material.

The magnesium carbonate can be a naturally occurring or synthetic magnesium carbonate.

For example, the magnesium carbonate encompasses naturally occurring or synthetic magnesium carbonate selected from the group comprising magnesite ($MgCO_3$), hydromagnesite ($Mg_5(CO_3)_4(OH)_2 \cdot 4H_2O$), artinite ($Mg_2(CO_3)(OH)_2 \cdot 3H_2O$), dypingite ($Mg_5(CO_3)_4(OH)_2 \cdot 5H_2O$), giorgiosite ($Mg(CO_3)_4(OH)_2 X5H_2O$), pokrovskite ($Mg_2(CO_3)(OH)_2 X0.5H_2O$), barringtonite ($MgCO_3 X2H_2O$), lansfordite ($MgCO_3 X5H_2O$), nesquehonite ($MgCO_3 X3H_2O$) and mixtures thereof.

Alternatively, the magnesium carbonate encompasses synthetic magnesium carbonate selected from the group comprising magnesite ($MgCO_3$), hydromagnesite ($Mg_5(CO_3)_4(OH)_2 X4H_2O$), artinite ($Mg_2(CO_3)(OH)_2 X3H_2O$), dypingite ($Mg_5(CO_3)_4(OH)_2 X5H_2O$), giorgiosite ($Mg_5(CO_3)_4(OH)_2 X5H_2O$), pokrovskite ($Mg_2(CO_3)(OH)_2 X0.5H_2O$), barringtonite ($MgCO_3 X2H_2O$), lansfordite ($MgCO_3 X5H_2O$), nesquehonite ($MgCO_3 X3H_2O$) and mixtures thereof.

According to one embodiment of the present invention, the magnesium carbonate-comprising material of step a) is selected from the group consisting of magnesium carbonate hydrate ($MgCO_3 *xH_2O$), non-hydrated magnesium carbonate ($MgCO_3$), magnesium carbonate hydroxide hydrate ($(MgCO_3)_z *Mg(OH)_2 *xH_2O$), and non-hydrated magnesium carbonate hydroxide ($(MgCO_3)_z *Mg(OH)_2$), preferably is selected from the group consisting of magnesite, barringtonite, nesquehonite, hydromagnesite and mixtures thereof and most preferably the magnesium carbonate-comprising material is hydromagnesite.

For example, the magnesium carbonate-comprising material of step a) is selected from the group consisting of magnesium carbonate hydrate ($MgCO_3 *xH_2O$), non-hydrated magnesium carbonate ($MgCO_3$), magnesium carbonate hydroxide hydrate ($(MgCO_3)_z *Mg(OH)_2 *xH_2O$), and non-hydrated magnesium carbonate hydroxide ($(MgCO_3)_z *Mg(OH)_2$), preferably is selected from the group consisting of magnesite, barringtonite, nesquehonite, hydromagnesite and mixtures thereof and most preferably the magnesium carbonate-comprising material is hydromagnesite and comprises the magnesium carbonate in an amount from 80.0 to 99.9 wt.-%, based on the total dry weight of the magnesium carbonate-comprising material, preferably from 90.0 to 99.5 wt.-%, more preferably from 95 to 99.3 wt.-%, and most preferably from 98.0 to 99.0 wt.-%, based on the total dry weight of the magnesium carbonate-comprising material.

In one embodiment of the present invention, the magnesium carbonate-comprising material comprises synthetic hydromagnesite ($Mg_5(CO_3)_4(OH)_2 X4H_2O$). Preferably, the magnesium carbonate-comprising material comprises synthetic hydromagnesite ($Mg_5(CO_3)_4(OH)_2 X4H_2O$) in an amount from 80.0 to 99.9 wt.-%, based on the total dry weight of the magnesium carbonate-comprising material, preferably from 90.0 to 99.5 wt.-%, more preferably from 95 to 99.3 wt.-%, and most preferably from 98.0 to 99.0 wt.-%, based on the total dry weight of the magnesium carbonate-comprising material.

According to one embodiment of the present invention, the magnesium carbonate-comprising material has a weight median particle size $d_{50}$ value in the range from 0.1 μm to 20 μm, preferably in the range from 0.25 μm to 15 μm, more preferably in the range from 0.5 μm to 10 μm and most preferably in the range from 1 μm to 6 μm. Additionally or alternatively, the magnesium carbonate-comprising material has a top cut ($d_{98}$) of ≤50 μm, preferably of ≤30 μm, more preferably of ≤20 μm and most preferably of ≤15 μm. Additionally or alternatively, the magnesium carbonate-comprising material has a specific surface area (BET) of from 0.5 to 150 $m^2/g$ as measured using nitrogen and the BET method according to ISO 9277:2010, preferably from 1 to 80 $m^2/g$, and more preferably from 40 to 70 $m^2/g$. Additionally or alternatively, the magnesium carbonate-comprising material has a moisture pick-up susceptibility of from 35 to 80 mg/g, preferably from 40 to 70 mg/g, and more preferably from 50 to 60 mg/g.

According to one embodiment of the present invention, the magnesium carbonate-comprising material has
i) a weight median particle size $d_{50}$ value in the range from 0.1 μm to 20 μm, preferably in the range from 0.25 μm to 15 μm, more preferably in the range from 0.5 μm to 10 μm and most preferably in the range from 1 μm to 6 μm and/or
ii) a top cut ($d_{98}$) of ≤50 μm, preferably of ≤30 μm, more preferably of ≤20 μm and most preferably of ≤15 μm and/or
iii) a specific surface area (BET) of from 0.5 to 150 $m^2/g$ as measured using nitrogen and the BET method according to ISO 9277:2010, preferably from 1 to 80 $m^2/g$, and more preferably from 40 to 70 $m^2/g$ and/or
iv) a moisture pick-up susceptibility of from 35 to 80 mg/g, preferably from 40 to 70 mg/g, and more preferably from 50 to 60 mg/g.

According to another embodiment of the present invention, the magnesium carbonate-comprising material has
i) a weight median particle size $d_{50}$ value in the range from 0.1 μm to 20 μm, preferably in the range from 0.25 μm to 15 μm, more preferably in the range from 0.5 μm to 10 μm and most preferably in the range from 1 μm to 6 μm and
ii) a top cut ($d_{98}$) of ≤50 μm, preferably of ≤30 μm, more preferably of ≤20 μm and most preferably of ≤15 μm and
iii) a specific surface area (BET) of from 0.5 to 150 $m^2/g$ as measured using nitrogen and the BET method according to ISO 9277:2010, preferably from 1 to 80 $m^2/g$, and more preferably from 40 to 70 $m^2/g$ and
iv) a moisture pick-up susceptibility of from 35 to 80 mg/g, preferably from 40 to 70 mg/g, and more preferably from 50 to 60 mg/g.

According to another embodiment of the present invention, the magnesium carbonate-comprising material has
i) a weight median particle size $d_{50}$ value in the range from 0.1 μm to 20 μm, preferably in the range from 0.25 μm to 15 μm, more preferably in the range from 0.5 μm to 10 μm and most preferably in the range from 1 μm to 6 μm or
ii) a top cut ($d_{98}$) of ≤50 μm, preferably of ≤30 μm, more preferably of ≤20 μm and most preferably of ≤15 μm or
iii) a specific surface area (BET) of from 0.5 to 150 $m^2/g$ as measured using nitrogen and the BET method according to ISO 9277:2010, preferably from 1 to 80 $m^2/g$, and more preferably from 40 to 70 $m^2/g$ or
iv) a moisture pick-up susceptibility of from 35 to 80 mg/g, preferably from 40 to 70 mg/g, and more preferably from 50 to 60 mg/g.

For example, the magnesium carbonate-comprising material used in the process of the present invention has
i) a weight median particle size $d_{50}$ value in the range from 0.1 μm to 20 μm, preferably in the range from 0.25 μm to 15 μm, more preferably in the range from 0.5 μm to 10 μm and most preferably in the range from 1 μm to 6 μm, for example 5.26 μm and
iii) a specific surface area (BET) of from 0.5 to 150 $m^2/g$ as measured using nitrogen and the BET method according to ISO 9277:2010, preferably from 1 to 80 $m^2/g$, and more preferably from 40 to 70 $m^2/g$, for example 62.1 $m^2/g$ and iv) a moisture pick-up susceptibility of from 35 to 80 mg/g, preferably from 40 to 70 mg/g, and more preferably from 50 to 60 mg/g, for example 57.5 mg/g.

Depending on the magnesium carbonate and the magnesium carbonate-comprising material, the magnesium carbonate preferably has a residual total moisture content of from 0.01 to 20 wt.-%, preferably from 0.01 to 15 wt.-%, more preferably from 0.02 to 12 wt.-% and most preferably from 0.04 to 10 wt.-%, based on the total dry weight of the magnesium carbonate. For example, the magnesium carbonate-comprising material has a residual total moisture content of 3.5 wt.-%. It is appreciated that the total moisture content includes crystal water as well as free water. Alternatively or additionally, the magnesium carbonate-comprising material preferably has a residual total moisture content of from 0.01 to 20 wt.-%, preferably from 0.01 to 15 wt.-%, more preferably from 0.02 to 12 wt.-% and most preferably from 0.04 to 10 wt.-%, based on the total dry weight of the magnesium carbonate-comprising material.

Characterization of Step b): Calcining the at Least One Magnesium Carbonate-Comprising Material of Step a)

According to step b) of the process of the present invention the at least one magnesium carbonate-comprising material of step a) is calcined at a temperature in the range between 450 to 750 éC to obtain a magnesium-oxide comprising material.

The term 'calcining_ in the meaning of the present invention refers to a thermal treatment process applied to solid materials causing loss of moisture, reduction or oxidation, and the decomposition of carbonates and other compounds resulting in an oxide of the corresponding solid material.

Magnesium carbonate decomposes at about 300 éC to magnesium oxide. The calcination step may be carried out under conditions and using equipment well-known to the person skilled in the art.

According to one preferred embodiment of the present invention the calcination step b) is carried out at a temperature in the range between 500 to 700 éC, and preferably at a temperature in the range between 550 and 650 éC, for example at 600 é éC.

Before the calcination step b) the at least one magnesium carbonate-comprising material of step a) can be dried, for example at 100 éC to reduce the moisture content of the magnesium carbonate-comprising material.

The calcining process of step b) of the process of the present invention is preferably conducted to the point where at least a part of the magnesium carbonate contained in the at least one magnesium carbonate-comprising material is converted to its respective oxides, i.e. magnesium oxide. Preferably at least 80 wt.-% of the magnesium carbonate is converted to magnesium oxide, even more preferably at least 90 wt.-% of the magnesium carbonate is converted to magnesium oxide, and most preferably at least 95 wt.-% of the magnesium carbonate is converted to magnesium oxide.

The time required for carrying out the calcining process of step b) is the time required to obtain a sufficient amount of magnesium oxide by the calcination of the at least one magnesium carbonate-comprising material for carrying out step c) of the process of the present invention. This time depends on the at least one magnesium carbonate-comprising material of step a), and the temperature during the reaction.

In a preferred embodiment, the at least one magnesium carbonate-comprising material of step a) is calcined for a period of time in the range between 15 min and 6 h, more preferably in the range between 45 min and 4 h and most preferably in the range between 1 h and 3 h, for example 2 h.

Generally, calcination may be carried out in furnaces or reactors (sometimes referred to as kilns) of various designs including shaft furnaces, rotary kilns, multiple hearth furnaces, and fluidized bed reactors.

The end of the calcination reaction may be determined, e.g. by monitoring the density change, the residual carbonate content e.g. by X-ray diffraction, or the slaking reactivity by common methods.

Characterization of Step c): Slaking_ the Magnesium Oxide-Comprising Material of Step b)

According to step c) of the process of the present invention, the at least one magnesium oxide-comprising material of step b) is slaked to obtain a magnesium hydroxide-comprising material.

'Slaking_ in the meaning of the present invention refers to a process in which magnesium oxide is hydrated. Thus, the term 'slaking_ refers to a process of adding water to magnesium oxide to produce magnesium hydroxide. Accordingly, the particles of magnesium oxide of the at least one magnesium oxide-comprising material obtained in step b) are hydrated in a slaking process, which is carried out by contacting the magnesium oxide of the at least one magnesium oxide-comprising material with water. According to the inventive process the magnesium oxide is at least partially converted into magnesium hydroxide.

The water to be used in the slaking process of step c) may be any water available such as tap water and/or deionised water and/or distilled water. Preferably, the water used for slaking the at least one magnesium oxide-comprising material of step b) is distilled water.

In one preferred embodiment of the present invention, the at least one magnesium oxide-comprising material of step b) is added to the water in one portion and/or continuously over a period of 1 h or less, preferably over a period of 45 min or less, more preferably over a period of 30 min or less and most preferably over a period of 15 min or less to yield or provide a suitable solid content in the resulting suspension. In another preferred embodiment, the at least one magnesium oxide-comprising material of step b) is added to water over a period of 10 min or less to a suitable solid content in the resulting suspension. Ina further preferred embodiment of the present invention, the at least one magnesium oxide-comprising material of step b) is added to the water in several portions to a suitable solid content in the resulting suspension, preferably in two to five portions, more preferably in two to four portions, even more preferably in two to three portions and most preferably in two portions.

In the case where the at least one magnesium oxide-comprising material of step b) is added to the water in several portions, the at least one magnesium oxide-comprising material of step b) is preferably added in about equal portions to the water. As an alternative, it is also possible to add the at least one magnesium oxide-comprising material of step b) in unequal portions to the water, i.e. in larger and smaller portions. In one preferred embodiment, the larger portion is added first followed by the addition of the smaller portion of the at least one magnesium oxide-comprising material to the resulting suspension in order to slake or hydrate the at least one magnesium oxide-comprising material provided in step b). In another preferred embodiment, the smaller portion of the at least one magnesium oxide-comprising material of step b) is added first followed by the addition of the larger portion to the water in order to convert the at least one magnesium oxide-comprising material of step b) at least partially into magnesium hydroxide.

The ratio of the at least one magnesium oxide-comprising material of step b) to water is preferably adjusted in such a way that the suspension develops a sufficient or suitable viscosity. In one preferred embodiment, a considerable excess of water is used, so that the ratio of water to the at least one magnesium oxide-comprising material in the suspension is such that the ratio (volume of water):(volume of the at least one magnesium oxide-comprising material) is from 50:1 to 1:1, more preferably from 30:1 to 2:1, even more preferably from 20:1 to 3:1 and most preferably from 10:1 to 4:1. In another preferred embodiment, the resulting aqueous suspension comprising water and the at least one magnesium oxide-comprising material of step b) has a solid content of between 1 wt.-% and 25 wt.-%, more preferably of between 5 wt.-% to 20 wt.-% and most preferably between 10 wt.-% and 17.5 wt.-%, based on the total weight of the suspension.

In one embodiment, the temperature of the water added into the reaction vessel for slaking said at least one magnesium oxide-comprising material of step b) is preferably in the range between 20 éC and 90 éC, more preferably in the range between 30 éC and 60 éC and most preferably in the range between 35 éC and 55 éC, for example 40 éC or 50 éC.

Alternatively, the water and the at least one magnesium oxide-comprising material of step b) are heated in the range between 20 éC and 100 éC, more preferably in the range between 50 éC and 98 éC and most preferably in the range between 70 éC and 95 éC, for example at about 90 éC after mixing. In order to prevent evaporation of the water, the system comprising the magnesium oxide-comprising material and the water as solvent are kept under reflux.

During the slaking process the temperature in the reaction vessel varies due to variation in water temperature, magnesium oxide reactivity, and quality of water and, thus, the temperature of the suspension may be adjusted frequently. Preferably, the temperature is controlled continuously. Alternatively, the temperature may be controlled repeatedly. In another preferred embodiment, the temperature of the suspension is not adjusted during step c) of the process of the present invention is carried out.

The slaking process of step c) may be carried out by agitation of the suspension. In this respect, agitation can be carried out continuously or discontinuously. However, as the degree of agitation during the slaking process may have an impact on the obtained magnesium hydroxide, the suspension is preferably agitated continuously. In this respect, too little agitation may result in uneven temperature within the suspension resulting in hot and cold spots.

The slaking process of step c) of the process of the present invention is preferably conducted to the point where at least a part of the magnesium oxide contained in the at least one magnesium oxide source is converted to its respective hydroxides, i.e. magnesium hydroxide. In this respect, it is to be noted that only a portion of the magnesium oxide contained in the at least one magnesium oxide source is converted into the respective magnesium hydroxide during the slaking process of step c).

In other words, the inventive process can be carried out with a mixture of magnesium oxide and magnesium hydroxide (which may be obtained by a partial slaking reaction) since the remaining magnesium oxide is successively converted into the magnesium hydroxide after the magnesium hydroxide already contained in the starting mixture reacted with the surface treatment agent of step d). The at least one magnesium oxide-comprising material of step b) may be added into the water for carrying out the slaking of step c) of the present invention in one or several portions and/or continuously over the time desired for carrying out the process of the present invention and/or until the desired amount of resulting product is obtained. In said process the amount of water may be adjusted frequently in order to obtain a solid content and/or viscosity suitable for carrying out the process of the present invention.

Preferably at least 80 wt.-% of the magnesium oxide is converted to magnesium hydroxide, even more preferably at least 90 wt.-% of the magnesium oxide is converted to magnesium hydroxide, even more preferably at least 95 wt.-% of the magnesium oxide is converted to magnesium hydroxide and most preferably at least 99.9 wt.-% of the magnesium oxide is converted to magnesium hydroxide.

The time required for carrying out the slaking process of step c) is the time required to obtain a sufficient amount of magnesium hydroxide by the hydration/slaking of the at least one magnesium oxide-comprising material for carrying out step d) of the process of the present invention. This time depends on the at least one magnesium oxide-comprising material of step b), the suspension concentration and the temperature of the water and during the reaction.

In a preferred embodiment, the at least one magnesium oxide-comprising material of step b) is slaked for a period of time in the range between 5 min and 30 min, more preferably in the range between 5 min and 20 min and most preferably in the range between 10 min and 20 min. Alternatively, the at least one magnesium oxide-comprising material of step b) may also be slaked for a longer period of time in the range between 5 min and 60 min, more preferably in the range between 10 min and 45 min and most preferably in the range between 20 min and 40 min.

After carrying out step c) of the present invention, the obtained mixture of magnesium hydroxide and optionally magnesium oxide is formed into a suitable suspension for carrying out step d). The overall solid content of this suspension is preferably in the range between 1 wt.-% and 25 wt.-%, more preferably between 5 wt.-% and 20 wt.-% and most preferably between 10 wt.-% and 20 wt.-%, based on the total weight of the suspension obtained in step c).

The obtained suspension comprising magnesium hydroxide and optionally magnesium oxide has preferably a pH of more than 8, more preferably of more than 9 and most preferably of more than 10.

Characterisation of Step d): Addition of at Least One Surface-Treatment Agent

According to step d) of the present invention at least one surface-treatment agent is added to the aqueous suspension obtained in step c) in an amount ranging from 0.05 to 10 mg surface treatment agent per m² of the surface area of the at least one calcium carbonate-comprising material as provided in step a), wherein the at least one surface treatment agent is a compound according to Formula (I),

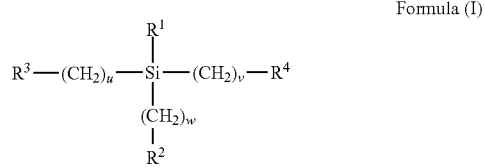

Formula (I)

wherein $R^1$ is a hydrolysable alkoxy group, and $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group, a benzoyl group and a fully or partially halogenated alkyl group having from 1 to 20 carbon atoms, and u, v and w are independently from each other an integer from 0 to 24.

The expression 'at least one_ surface-treatment agent means that one or more, for example two or three surface-treatment agents may be added to the aqueous suspension obtained in step c). According to a preferred embodiment of the present invention only one surface-treatment agent is added to the aqueous suspension obtained in step c).

The term 'surface-treatment agent_ according to the present invention is an agent that may be used to treat the surface of the at least one magnesium hydroxide-comprising material. The surface-treatment agent of the present invention is a silane agent that comprises at least one hydrolysable alkoxy group attached to the Si atom.

The 'hydrolysable alkoxy group_ attached to the Si atom according to the present invention hydrolyses readily with water to form a silanol Si—OH group. The alkoxy group according to the present invention is an alkyl group that is singular bonded to an oxygen atom. The oxygen atom according to the present invention is bonded to the Si atom of formula I. The alkyl group of the alkoxy group in the meaning of the present invention refers to a linear, saturated organic compound composed of carbon and hydrogen. According to a preferred embodiment the alkyl group of the alkoxy group is a linear alkyl group having a total amount of carbon atoms from C1 to C15, preferably from C1 to C8 and most preferably from C1 to C2. According to an exemplified embodiment of the present invention the hydrolysable alkoxy group is a methoxy or an ethoxy group.

According to the present invention $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group, a benzoyl group and a fully or partially halogenated alkyl group having from 1 to 20 carbon atoms.

A hydroxyl group in the meaning of the present invention is one oxygen atom connected by a covalent bonding to one hydrogen atom (—OH group).

The term 'alkyl_ in the meaning of the present invention refers to a linear or branched, saturated organic compound composed of carbon and hydrogen having 1 to 28, preferably 8 to 26, more preferably 14 to 22, and most preferably 16 to 20 carbon atoms.

The vinyl group in the meaning of the present invention is the functional group —CH═CH$_2$.

The acyloxy group according to the present invention is an acyl group that is singular bonded to an oxygen atom. The acyl group according to the present invention is an alkyl group that is attached to a CO group with a single bond. Therefore, the acyloxy group has the chemical formula —O(O)CR$^5$, wherein R$^5$ represents the alkyl group. The alkyl group of the acyloxy group in the meaning of the present invention refers to a linear or branched, saturated organic compound composed of carbon and hydrogen having a total amount of carbon atoms from C1 to C15, preferably from C1 to C8 and most preferably from C1 to C6.

According to the present invention the acryloxy group has the following formula II wherein $R^6$ is hydrogen, the methacryloxy group has the following formula II wherein $R^6$ is methyl and the ethacryloxy group has the following formula II wherein $R^6$ is ethyl.

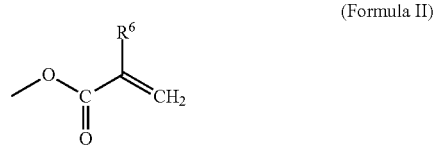

(Formula II)

The carboxyl group according to the present invention consists of a carbon atom that forms two chemical bonds to one oxygen atom and one chemical bond to a second oxygen atom. This second oxygen is also bonded to a hydrogen atom. The arrangement is written —C(O)OH.

The epoxy group according to the present invention consists of an oxygen atom joined by single bonds to two adjacent carbon atoms, thus forming the three-membered epoxide ring.

An anhydride group comprises two acyl groups bonded to one oxygen atom. According to the present invention the anhydride group has the chemical formula —C(O)OC(O)R$^7$, wherein R$^7$ represents an alkyl group. The alkyl group of the anhydride group in the meaning of the present invention refers to a linear or branched, saturated organic compound composed of carbon and hydrogen having a total amount of carbon atoms from C1 to C15, preferably from C1 to C8 and most preferably from C1 to C6. According to another embodiment the anhydride group is a cyclic anhydride group.

The ester group according to the present invention has the chemical formula —C(O)OR$^8$, wherein R$^8$ represents an alkyl group. The alkyl group of the ester group in the meaning of the present invention refers to a linear or branched, saturated organic compound composed of carbon and hydrogen having a total amount of carbon atoms from C1 to C15, preferably from C1 to C8 and most preferably from C1 to C6.

The aldehyde group in the meaning of the present invention is the functional group —C(O)H.

The amino group in the meaning of the present invention is the functional group —NH$_2$.

The ureido group in the meaning of the present invention is the functional group —NH—C(O)—NH$_2$.

The azide group in the meaning of the present invention is the functional group —N$_3$.

The halogen group in the meaning of the present invention comprises fluorine —F, chlorine —Cl, bromine —Br and iodine —I, preferably is chlorine —Cl and fluorine —F, and most preferably is fluorine —F.

The phosphonate group according to the present invention has the chemical formula —P(O)OR$^9$OR$^{10}$, wherein R$^9$ and R$^{10}$ are independently from each other selected from the group consisting of hydrogen or an alkyl group. The alkyl group of the phosphonate group in the meaning of the present invention refers to a linear or branched, saturated organic compound composed of carbon and hydrogen having a total amount of carbon atoms from C1 to C15, preferably from C1 to C8 and most preferably from C1 to C6.

The phosphine group according to the present invention has the chemical formula —$PR^{11}R^{12}$, wherein $R^{11}$ and $R^{12}$ are independently from each other selected from the group consisting of hydrogen or an alkyl group. The alkyl group of the phosphine group in the meaning of the present invention refers to a linear or branched, saturated organic compound composed of carbon and hydrogen having a total amount of carbon atoms from C1 to C15, preferably from C1 to C8 and most preferably from C1 to C6.

The sulphonate group in the meaning of the present invention is the functional group —S(O)(O)OH.

The sulphide group according to the present invention has the chemical formula —$SR^{13}$, wherein $R^{13}$ is an alkyl group. The alkyl group of the sulphide group in the meaning of the present invention refers to a linear or branched, saturated organic compound composed of carbon and hydrogen having a total amount of carbon atoms from C1 to C15, preferably from C1 to C8 and most preferably from C1 to C6.

The disulphide group according to the present invention has the chemical formula —$SSR^{14}$, wherein $R^1$ is a hydrogen or an alkyl group. The alkyl group of the disulphide group in the meaning of the present invention refers to a linear or branched, saturated organic compound composed of carbon and hydrogen having a total amount of carbon atoms from C1 to C15, preferably from C1 to C8 and most preferably from C1 to C6.

The isocyanate group in the meaning of the present invention is the functional group —NC(O). A masked isocyanate group according to the present invention refers to an isocyanate group that is masked or blocked by a masking agent. At temperatures of above 120 éC the masking agent will be split of the surface treatment agent and the isocyanate group will be obtained.

The thiol group in the meaning of the present invention is the functional group —SH.

The phenyl group or phenyl ring in the meaning of the present invention is a cyclic group with the formula —$C_6H_5$.

The benzyl group in the meaning of the present invention is the functional group —$CH_2C_6H_5$.

The styryl group in the meaning of the present invention is the functional group —CH═CH—$C_6H_5$.

The benzoyl group in the meaning of the present invention is the functional group —C(O)$C_6H_5$.

The fully or partially halogenated alkyl group having from 1 to 20 carbon atoms in the meaning of the present invention refers to a linear or branched, saturated organic compound composed of carbon and hydrogen having 1 to 20, preferably 8 to 15, more preferably 10 to 12, carbon atoms, wherein at least one hydrogen or more, up to all hydrogens are substituted by a halogen group. The halogen group may be the same or different but preferably is the same group.

According to the present invention u, v and w are independently from each other an integer from 0 to 24. According to one embodiment u, v and w are the same and are an integer from 0 to 24, or from 2 to 20 or from 3 to 12. According to another embodiment u, v and w are different. For example, u is an integer from 0 to 24, v is an integer from 0 to 24 and w is an integer from 0 to 24. According to a preferred embodiment u and w are the same und v is a different integer. For example, u and w may be an integer from 0 to 24, or from 1 to 20 or from 2 to 18 or from 3 to 12 and v may be an integer from 0 to 24, or from 1 to 20, or from 2 to 18 or from 3 to 12. According to another preferred embodiment u and w may be 0 and v may be an integer from 0 to 24, or from 1 to 20, or from 2 to 18 or from 3 to 12. According to an exemplified embodiment v is 3.

According to the present invention $R^1$ is a hydrolysable alkoxy group, and $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group, a benzoyl group, and a fully or partially halogenated alkyl group having from 1 to 20 carbon atoms.

According to a preferred embodiment $R^1$ is a hydrolysable alkoxy group, and $R^2$ is an alkoxy group. According to a more preferred embodiment $R^1$ is a hydrolysable alkoxy group, and $R^2$ as well as $R^3$ are alkoxy groups. The alkoxy group of $R^2$ and/or $R^3$ may also be a hydrolysable alkoxy group. According to an even more preferred embodiment of the present invention $R^1$, $R^2$ and $R^3$ are the same hydrolysable alkoxy groups and most preferably are methoxy or ethoxy groups. In the foregoing embodiment $R^4$ is preferably independently from $R^1$, $R^2$ and $R^3$ selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group, a benzoyl group and a fully or partially halogenated alkyl group having from 1 to 20 carbon atoms and u, v and w are independently from each other an integer from 0 to 24. According to a preferred embodiment $R^4$ is selected from the group consisting of an alkyl group, a vinyl group, an amino group and a fully or partially halogenated alkyl group having from 1 to 20 carbon atoms, u and w are 0 and v is an integer from 0 to 24.

According to one embodiment of the present invention the at least one surface treatment agent is a compound according to Formula (I), wherein $R^1$, $R^2$, $R^3$ and/or $R^4$ are independently from each other a methoxy or an ethoxy group. Additionally or alternatively, the at least one surface-treatment agent is selected from triethoxysilane and/or trimethoxysilane and preferably is selected from the group consisting of triethoxyvinylsilane, trimethoxyvinylsilane, 3-(2,3-epoxypropoxy)propyl-trimethoxysilane, triethoxysilylpropyltetrasulphide, 3-mercaptopropyltrimethoxysilane, 3-methacryloxypropyltrimethoxysilane, 3-aminopropyltriethoxysilane, methyltriethoxysilane, 3-glycidoxypropyltrimethoxysilane, dodecyltriethoxysilane, n-octadecyltriethoxysilane, phenyltriethoxysilane, 3-butenyltriethoxysilane, 1H,1H,2H,2H-perfluorooctyltriethoxysilane and combinations thereof and most preferably is triethoxyvinylsilane, trimethoxyvinylsilane, n-octadecyltriethoxysilane,1H,1H,2H,2H-perfluorodecyltriethoxysilane, 1H,1H,2H,2H-perfluorooctyltriethoxysilane and combinations thereof.

According to another embodiment of the present invention the at least one surface-treatment agent is a compound according to Formula (I), wherein $R^1$, $R^2$ and $R^3$ are a methoxy or an ethoxy group, $R^4$ is an alkyl group and u, v and w is 0. According to a preferred embodiment $R^4$ is a linear alkyl group having 1 to 28, preferably 8 to 26, more preferably 14 to 22, even more preferably 16 to 20 and most preferably 18 carbon atoms and u, v and w is 0. For example the surface-treatment agent is n-octadecyltriethoxysilane.

According to another embodiment of the present invention the at least one surface-treatment agent is a compound according to Formula (I), wherein $R^1$, $R^2$ and $R^3$ are a methoxy or an ethoxy group, $R^4$ is a fully or partially halogenated alkyl group having from 1 to 20 carbon atoms, u and w is 0 and v is an integer from 0 to 24. According to a preferred embodiment $R^1$, $R^2$ and $R^3$ are an ethoxy group, $R^4$ is a fully halogenated alkyl group having from 2 to 16, preferably 3 to 12, more preferably 4 to 10, and most preferably 6 or 8 carbon atoms, u and w is 0 and v is an integer from 1 to 10 and preferably is 2. For example the surface-treatment agent is 1H,1H,2H,2H-perfluorodecyltriethoxysilane or, 1H,1H,2H,2H-perfluorooctyltriethoxysilane.

According to another embodiment of the present invention the at least one surface-treatment agent is a compound according to Formula (I), wherein $R^1$, $R^2$ and $R^3$ are a methoxy or an ethoxy group, $R^4$ is an vinyl group, u and w are 0 and v is an integer from 0 to 24. According to a preferred embodiment u and w are 0 and v is an integer from 0 to 20, and preferably is 0. For example the surface-treatment agent is triethoxyvinylsilane or trimethoxyvinylsilane.

According to one embodiment of the present invention the amount of the at least one surface-treatment agent added in step d) is in the range from 0.01 to 9 mg surface-treatment agent per $m^2$ of the surface area of the at least one magnesium oxide-comprising material, preferably in the range from 0.1 to 8 mg surface-treatment agent per $m^2$ of the surface area of the at least one magnesium oxide-comprising material and most preferably in the range from 0.11 to 6 mg surface-treatment agent per $m^2$ of the surface area of the at least one magnesium oxide-comprising material. The step of adding the at least one surface-treatment agent, in one or more steps, to the aqueous suspension obtained in step c) preferably takes place under mixing conditions. The skilled person will adapt these mixing conditions (such as the configuration of mixing pallets and mixing speed) according to his process equipment.

In one embodiment of the present invention, the process step d) may be a continuous process. In this case, it is possible to add the at least one surface-treatment agent to the aqueous suspension obtained in step c) in a constant flow such that a constant concentration of the at least one surface-treatment agent is provided during step d).

Alternatively, the at least one surface-treatment agent is added to the aqueous suspension obtained in step c) in one step, wherein said at least one surface-treatment agent is preferably added in one portion.

In another embodiment, the inventive process may be a batch process, i.e. the at least one surface-treatment agent is added to the aqueous suspension obtained in step c) in more than one step, wherein said at least one surface-treatment agent is preferably added in about equal portions. Alternatively, it is also possible to add the at least one surface-treatment in unequal portions to the aqueous suspension obtained in step c), i.e. in larger and smaller portions.

According to one embodiment of the present invention, step d) is carried out in a batch or continuous process for a period of time from 0.1 to 1000 s. For example, step d) is a continuous process and comprises one or several contacting steps and the total contacting time is from 0.1 to 20 s, preferably from 0.5 to 15 s and most preferably from 1 to 10 s.

The surface-treatment agent may be used in 'solid_ form or as 'liquid_.

A 'solid surface-treatment agent_ is solid under standard ambient temperature and pressure (SATP) which refers to a temperature of 298.15 K (25 éC) and an absolute pressure of exactly 100 000 Pa (1 bar, 14.5 psi, 0.98692 atm). If the surface-treatment agent is in solid form it can be added to the aqueous suspension of step c) for example as powder, tablet, granules, flakes etc.

However, the solid surface-treatment agent may also be dissolved/dispersed in a solvent and added as solution/suspension to the aqueous suspension obtained in step c).

For example, n-octadecyltriethoxysilane is liquid under standard ambient temperature and pressure (SATP) which refers to a temperature of 298.15 K (25 éC) and an absolute pressure of exactly 100 000 Pa (1 bar, 14.5 psi, 0.98692 atm). If the surface-treatment agent is in liquid form it can be added to the aqueous suspension obtained in step c) for example as neat liquid or as solution wherein the liquid base is mixed with a solvent.

According to an exemplified embodiment of the present invention the surface-treatment agent is triethoxyvinylsilane, trimethoxyvinylsilane, n-octadecyltriethoxysilane,1H, 1H,2H,2H-perfluorodecyltriethoxysilane or 1H,1H,2H,2H-perfluorooctyltriethoxysilane which are liquid under standard ambient temperature and pressure (SATP) which refers to a temperature of 298.15 K (25 éC) and an absolute pressure of exactly 100 000 Pa (1 bar, 14.5 psi, 0.98692 atm).

The solvent that may be used to dilute/dissolve/disperse the surface-treatment agent may be water and/or an organic solvent that is miscible with water, for example, an organic solvent like ethanol, methanol, acetone, ethylene glycol, glycerine or propanol. According to a preferred embodiment the solvent consists of water. According to another preferred embodiment the solvent is a mixture of water and at least one organic solvent that is miscible with water. Preferably, the solvent is a mixture consisting of water and ethanol.

According to one embodiment of the present invention the solids content of the diluted/dissolved/dispersed solution/suspension comprising the solvent and the at least one surface-treatment agent is in the range from 0.1 to 99.9 wt.-%, preferably in the range from 1 to 90 wt.-%, more preferably in the range from 2 to 60 wt.-%, and most preferably in the range from 3 to 50 wt.-%, based on the total weight of the suspension/solution. For example, the solids content of the diluted/dissolved/dispersed solution/suspension comprising the solvent and the at least one surface-treatment agent is about 15 wt.-%, based on the total weight of the suspension/solution.

According to another embodiment of the present invention the at least one surface-treatment agent or the diluted/dissolved/dispersed solution/suspension comprising the solvent and the at least one surface-treatment agent is preheated, before addition step d) is carried out. That is to say, the at least one surface-treatment agent or the diluted/dissolved/dispersed solution/suspension comprising the solvent and the at least one surface-treatment agent is treated at a temperature of from 30 to 120 éC, preferably of from 45 to 115 °C, more preferably of from 50 to 100 °C and most preferably of from 60 to 90 °C before addition step d) is carried out.

The treatment time for carrying out the preheating of the at least one surface-treatment agent or the diluted/dissolved/dispersed solution suspension comprising the solvent and the at least one surface-treatment agent is carried out for a period of 60 min or less, preferably for a period of 20 min or less and more preferably for a period of 15 min or less.

According to another embodiment of the present invention the at least one surface-treatment agent or the diluted/dissolved/dispersed solution/suspension comprising the solvent and the at least one surface-treatment agent is preheated at a temperature of from 30 to 120 °C, preferably of from 45 to 115 °C, more preferably of from 50 to 100 °C and most preferably of from 60 to 90 °C before addition step d) is carried out for a period of 60 min or less, preferably for a period of 20 min or less and more preferably for a period of 15 min or less.

In one embodiment of the present invention, the preheating of the at least one surface-treatment agent or the diluted/dissolved/dispersed solution/suspension comprising the solvent and the at least one surface-treatment agent is carried out at a temperature that is of about equal to the temperature implemented during slaking step c).

The term 'equal' temperature in the meaning of the present invention refers to a preheating temperature that is at most 20 °C, preferably at most 15 °C, more preferably 10 °C and most preferably at most 5 °C, below or above the temperature implemented during slaking step c).

The preheating of the at least one surface-treatment agent or the diluted/dissolved/dispersed solution/suspension comprising the solvent and the at least one surface-treatment agent preferably takes place under mixing conditions. The skilled man will adapt these mixing conditions (such as the configuration of mixing pallets and mixing speed) according to his process equipment.

According to a preferred embodiment of the present invention the at least one surface-treatment agent or the diluted/dissolved/dispersed solution/suspension comprising the solvent and the at least one surface-treatment agent may be treated with at least one base before or after the addition step d).

The term 'base' according to the present invention refers to a base as defined by the Brønsted-Lowry theory. Therefore, a base in the meaning of the present invention is a substance that can accept hydrogen ions ($H^+$), otherwise known as protons.

The expression 'at least one' base means that one or more, for example two or three bases may be added to the surface-treatment agent or the diluted/dissolved/dispersed solution/suspension comprising the solvent and the at least one surface-treatment agent. According to a preferred embodiment of the present invention only one base is added to the surface-treatment agent or the diluted/dissolved/dispersed solution/suspension comprising the solvent and the at least one surface-treatment agent.

According to one embodiment of the present invention the at least one base is selected from the group consisting of lithium hydroxide, sodium hydroxide, potassium hydroxide, calcium hydroxide, magnesium hydroxide, ammonium hydroxide and mixtures thereof and preferably is potassium hydroxide.

The base may be used in 'solid' form. For example, potassium hydroxide, lithium hydroxide, and sodium hydroxide are solid under standard ambient temperature and pressure (SATP) which refers to a temperature of 298.15 K (25 °C) and an absolute pressure of exactly 100 000 Pa (1 bar, 14.5 psi, 0.98692 atm). If the base is in solid form it can be added to the diluted/dissolved/dispersed solution/suspension comprising the solvent and the at least one surface-treatment agent for example as powder, tablet, granules, flakes etc.

However, the solid base may also be dissolved/dispersed in water and added as solution to the surface-treatment agent.

Ammonium hydroxide according to the present invention is a solution of ammonia ($NH_3$) in water and, therefore, ammonium hydroxide is used as liquid.

According to an exemplified embodiment of the present invention the base is potassium hydroxide which is solid under standard ambient temperature and pressure (SATP) which refers to a temperature of 298.15 K (25 °C) and an absolute pressure of exactly 100 000 Pa (1 bar, 14.5 psi, 0.98692 atm). The potassium hydroxide may be added to the surface-treatment agent as powder.

The addition of the at least one base to the surface-treatment agent can be accomplished by any conventional means known to the skilled person. Preferably, the addition may be carried out under mixing and/or homogenizing and/or particle dividing conditions. The skilled person will adapt these mixing and/or homogenizing and/or particle dividing conditions such as the mixing speed, dividing, and temperature according to his process equipment.

For example, the mixing and homogenizing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time.

Choppers and/or dispersers are used to disperse lumps in a dry operation. Equipment that may be used in the inventive process is available, for example, from Gebræder LØJige Maschinenbau GmbH, Germany or from VISCOJET RæhrsystemeGmbH, Germany.

The base may be added to the surface-treatment agent in the range of 0.1 to 80 wt.-%, preferably in the range of 1 to 60 wt.-%, more preferably in the range of 5 to 30 wt.-%, and most preferably in the range of 10 to 20 wt.-%, based on the dry weight of the surface-treatment agent.

Alternatively, the base may be added to the surface-treatment agent or the diluted/dissolved/dispersed solution/suspension comprising the solvent and the at least one surface-treatment agent in an amount such that the pH of the diluted/dissolved/dispersed solution/suspension comprising the solvent and the at least one surface-treatment agent is in the range from 7.5 to 14, preferably from 8 to 13 and most preferably from 8.5 to 12.

The pH adjustment can be measured with any pH meter that may be used for measuring the pH in suspension, for example, a Mettler Toledo Seven Easy pH meter with a Mettler Toledo InLab⁺ Expert Pro pH electrode. The pH is measured at 25 °C and the pH is stable according to the present invention when there is no change in the pH value within ě 0.2 units for 5 min.

During and/or after adding step d) the aqueous suspension may be mixed. According to one embodiment the addition is carried out under mixing conditions. Additionally or alternatively, the aqueous suspension is mixed after step d).

The mixing of the aqueous suspension can be accomplished by any conventional means known to the skilled person. The skilled person will adapt the mixing conditions such as the mixing speed, dividing, and temperature according to his process equipment. Additionally, the mixing may be carried out under homogenizing and/or particle dividing conditions.

For example, the mixing and homogenizing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. C hoppers and/or dispersers are used to disperse lumps in a dry operation. Equipment that may be used in the inventive process is available, for example, from Gebræder Lødige Maschinenbau GmbH, Germany or from VISCO-JET Ræhrsysteme GmbH, Germany.

According to one embodiment of the present invention the aqueous suspension is mixed at a temperature in the range from 20 to 120 éC, preferably at a temperature in the range from 45 to 115 éC, preferably from 50 to 100 éC and more preferably in the range from 70 to 100 éC. The advantage of such a temperature during mixing step d) is that the surface-treatment agent is bound stronger to the surface of the magnesium hydroxide-comprising material as without such a temperature.

According to another embodiment of the present invention mixing is carried out for at least 1 min, preferably for at least 5 min, e.g. for at least 10 min, 15 min, 30 min, 45 min or 60 min. According to a preferred embodiment mixing is carried out for a period of time ranging from 1 min to 60 min, preferably for a period of time ranging from 15 min to 45 min. For example, the mixing is carried out for 30 min ě 5 min.

Characterisation of Step e): Drying the Aqueous Suspension During or after Step d)

According to step e) of the present invention the aqueous suspension is dried during or after step d) at ambient or reduced pressure until the moisture content of the obtained surface-treated magnesium hydroxide-comprising material is in the range from 0.001 to 20 wt.-%, based on the total weight of the surface-treated magnesium hydroxide-comprising material.

According to a preferred embodiment of the present invention step e) is carried out at a temperature in the range from 20 to 200 éC, preferably from 40 to 160 éC and more preferably from 50 to 155 éC, even more preferably from 70 to 150 éC and most preferably from 80 to 110 éC. For example, step e) is carried out at a temperature of 110 éC ě5 éC.

According to a preferred embodiment of the present invention step e) is carried out at a temperature in the range from 20 to 200 éC at ambient pressure, preferably from 40 to 160 éC and more preferably from 50 to 155 éC, even more preferably from 70 to 150 éC and most preferably from 80 to 110 éC at ambient pressure. For example, step e) is carried out at a temperature of 110 éC ě5 éC at ambient pressure.

According to one embodiment of the present invention step e) is carried out at a temperature in the range from 20 to 200 éC at ambient pressure, until the moisture content of the obtained surface-treated magnesium hydroxide-comprising material is in the range from 0.001 to 20 wt.-%, based on the total weight of the surface-treated magnesium hydroxide-comprising material. Alternatively, step e) is carried out at a temperature in the range from 40 to 160 éC and more preferably from 50 to 155 éC, even more preferably from 70 to 150 éC and most preferably from 80 to 110K at ambient pressure until the moisture content of the obtained surface-treated magnesium hydroxide-comprising material is in the range from 0.001 to 20 wt.-%, based on the total weight of the surface-treated magnesium hydroxide-comprising material.

The drying may be carried out at ambient pressure or at reduced pressure. The ambient pressure refers to a value of exactly 100 000 Pa (1 bar, 14.5 psi, 0.98692 atm). A reduced pressure according to the present invention is defined as any pressure that is below the ambient pressure. According to a preferred embodiment the drying is carried out at ambient pressure.

According to the present invention the aqueous suspension is dried during or after step d) until the moisture content of the obtained surface-treated magnesium hydroxide-comprising material is in the range from 0.001 to 20 wt.-%, based on the total weight of the surface-treated magnesium hydroxide-comprising material. The 'moisture content_ is measured gravimetrically as the weight loss upon heating to 150 éC.

According to a preferred embodiment of the present invention step e) is carried out until the moisture content of the obtained surface-treated magnesium hydroxide-comprising material is in the range from 0.005 to 15 wt.-%, preferably in the range from 0.01 to 10 wt.-% and more preferably from 0.05 to 5 wt.-%, based on the total weight of the surface-treated magnesium hydroxide-comprising material.

According to one embodiment of the present invention the surface-treated magnesium hydroxide-comprising material obtained in step e) has a weight median particle size $d_{50}$ value in the range from 0.1 ɰm to 20 ɰm, preferably in the range from 0.25 ɰm to 15 ɰm, more preferably in the range from 0.5 ɰm to 10 ɰm and most preferably in the range from 1 ɰm to 6 ɰm. Additionally or alternatively, the surface-treated magnesium hydroxide-comprising material obtained in step e) has a top cut ($d_{98}$) of ꞉50 ɰm, preferably of ꞉30 ɰm, more preferably of ꞉20 ɰm and most preferably of ꞉15 ɰm. Additionally or alternatively, the surface-treated magnesium hydroxide-comprising material obtained in step e) has a specific surface area (BET) of from 15 to 150 $m^2/g$ as measured using nitrogen and the BET method according to ISO 9277:2010, preferably from 20 to 80 $m^2/g$, and more preferably from 30 to 70 $m^2/g$. Additionally or alternatively, the surface-treated magnesium hydroxide-comprising material obtained in step e) has a moisture pick-up susceptibility of from 0.1 to 10 mg/g, preferably from 0.5 to 7 mg/g, and more preferably from 1 to 5 mg/g.

According to one embodiment of the present invention the surface-treated magnesium hydroxide-comprising material obtained in step e) has
i) a weight median particle size $d_{50}$ value in the range from 0.1 ɰm to 20 ɰm, preferably in the range from 0.25 ɰm to 15 ɰm, more preferably in the range from 0.5 ɰm to 10 ɰm and most preferably in the range from 1 ɰm to 6 ɰm and
ii) a top cut ($d_{98}$) of ꞉50 ɰm, preferably of ꞉30 ɰm, more preferably of ꞉20 ɰm and most preferably of ꞉15 ɰm and
iii) a specific surface area (BET) of from 15 to 150 $m^2/g$ as measured using nitrogen and the BET method according to ISO 9277:2010, preferably from 20 to 80 $m^2/g$, and more preferably from 30 to 70 $m^2/g$ and
iv) a moisture pick-up susceptibility of from 0.1 to 10 mg/g, preferably from 0.5 to 7 mg/g, and more preferably from 1 to 5 mg/g.

According to one embodiment of the present invention the surface-treated magnesium hydroxide-comprising material obtained in step e) has
  i) a weight median particle size $d_{50}$ value in the range from 0.1 µm to 20 µm, preferably in the range from 0.25 µm to 15 µm, more preferably in the range from 0.5 µm to 10 µm and most preferably in the range from 1 µm to 6 µm or
  ii) a top cut ($d_{98}$) of ⩽50 µm, preferably of ⩽30 µm, more preferably of ⩽20 µm and most preferably of ⩽15 µm or
  iii) a specific surface area (BET) of from 15 to 150 m²/g as measured using nitrogen and the BET method according to ISO 9277:2010, preferably from 20 to 80 m²/g, and more preferably from 30 to 70 m²/g or
  iv) a moisture pick-up susceptibility of from 0.1 to 10 mg/g, preferably from 0.5 to 7 mg/g, and more preferably from 1 to 5 mg/g.

For example, the surface-treated magnesium hydroxide-comprising material obtained in step e) has
  i) a weight median particle size $d_{50}$ value in the range from 0.1 µm to 20 µm, preferably in the range from 0.25 µm to 15 µm, more preferably in the range from 0.5 µm to 10 µm and most preferably in the range from 1 µm to 6 µm and
  iii) a specific surface area (BET) of from 15 to 150 m²/g as measured using nitrogen and the BET method according to ISO 9277:2010, preferably from 20 to 80 m²/g, and
  iv) a moisture pick-up susceptibility of from 0.1 to 10 mg/g, preferably from 0.5 to 7 mg/g, and more preferably from 1 to 5 mg/g.

According to one embodiment of the present invention, the surface-treated magnesium hydroxide-comprising material obtained in step e) has a moisture pick-up susceptibility to specific surface area (BET) ratio of 0.001 to 0.5 mg/m², preferably from 0.005 to 0.4 mg/m², even more preferably from 0.01 to 0.15 mg/m² and most preferably from 0.06 to 0.09 mg/m². The ratio of moisture pick-up susceptibility to specific surface area (BET) is also known as the 'normalized moisture pickup susceptibility_ of a material and refers to the amount of moisture absorbed on the surface of said material within a certain time upon exposure to a defined humid atmosphere and is expressed in mg/m². The precise measurement methods are defined in the examples section.

The inventors surprisingly found out that by the foregoing process it is possible to prepare surface-treated magnesium hydroxide-comprising materials having improved surface characteristics, like a high hydrophobicity or the ability to react with surrounding materials. Furthermore, by the process according to the present invention a surface-treated magnesium hydroxide-comprising material with a large surface area in combination with a low moisture pick up susceptibility is provided, compared to surface-treated magnesium hydroxide-comprising materials prepared by conventional processes.

Further Process Steps

According to another embodiment of the present invention mechanical dewatering, preferably by centrifugation or filtration, is carried out before and/or during step e), and/or the surface-treated magnesium hydroxide-comprising material is washed with water during and/or after step d). According to a preferred embodiment of the present invention mechanical dewatering, preferably by centrifugation or filtration, is carried out during step e), and the surface-treated magnesium hydroxide-comprising material is washed with water during and/or after step d). According to another preferred embodiment of the present invention mechanical dewatering, preferably by centrifugation or filtration, is carried out during step e), or alternatively the surface-treated magnesium hydroxide-comprising material is washed with water during and/or after step d).

Such mechanical dewatering may be undertaken by all the techniques and methods well known to the person skilled in the art for reducing the water content of an aqueous suspension. The mechanical dewatering is preferably carried out by centrifugation or by filtration, for example, in a vertical plate pressure filter, a tube press or a vacuum filter. Preferably, dewatering step is carried out under pressure.

Such washing may be undertaken by all the techniques and methods well known to the person skilled in the art for reducing the water content of an aqueous suspension. The washing, for example, may be carried out by rinsing the mechanical dewatered surface-treated calcium carbonate-comprising material with water. The surface-treated magnesium hydroxide-comprising material is washed with water during and/or after step d). According to one embodiment the surface-treated magnesium hydroxide-comprising material is washed with water during and after step d). Alternatively, the surface-treated magnesium hydroxide-comprising material is washed with water during step d) or the surface-treated magnesium hydroxide-comprising material is washed with water after step d).

According to one embodiment of the present invention the process comprises a further step g) after or during step e) of deagglomerating the surface-treated magnesium hydroxide-comprising material of step d) or e), and preferably step g) is carried out during step e). According to another embodiment of the present invention the process comprises a further step g) after step e) of deagglomerating the surface-treated magnesium hydroxide-comprising material of step d) or e). According to a preferred embodiment of the present invention the process comprises a further step g) during step e) of deagglomerating the surface-treated magnesium hydroxide-comprising material of step d) ore).

The term 'deagglomerating_ in the meaning of the present invention refers to the breaking up of agglomerates which may have formed during the dewatering step and/or the drying step.

The deagglomerating may be carried out by any process known to the skilled man that is suitable for deagglomeration. For example, the deagglomeration step may be a dry grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man.

In one embodiment of the present invention, the inventive process may be a continuous process. Alternatively, the inventive process may be a batch process. According to a preferred embodiment of the present invention, the inventive process is a batch process, i.e. the calcining step b), the slaking step c), the surface-treatment step d) and the drying step e) are performed in individual steps one after the other.

Surface-Treated Magnesium Hydroxide-Comprising Material

According to one embodiment of the present invention, a surface-treated magnesium hydroxide-comprising material obtainable by a process according to the present invention is provided.

According to another embodiment of the present invention a surface-treated magnesium hydroxide-comprising material is obtained by a process comprising the following steps:

a) providing at least one magnesium carbonate-comprising material, b) calcining the at least one magnesium carbonate-comprising material of step a) at a temperature in the range between 450 to 750 éC to obtain a magnesium oxide-comprising material, c) slaking the magnesium oxide-comprising material of step b) to obtain a magnesium hydroxide-comprising material, d) adding at least one surface-treatment agent to the aqueous suspension obtained in step c) in an amount ranging from 0.05 to 10 mg surface treatment agent per m² of the specific surface area of the at least one magnesium oxide-comprising material as obtained in step b), wherein the specific surface area (BET) is measured using nitrogen and the BET method according to ISO 9277:2010 and wherein the at least one surface treatment agent is a compound according to Formula (I),

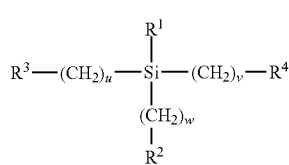

Formula (I)

wherein $R^1$ is a hydrolysable alkoxy group, and $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group, a benzoyl group and a fully or partially halogenated alkyl group having from 1 to 20 carbon atoms, and u, v and w are independently from each other an integer from 0 to 24, e) drying the aqueous suspension during or after step d) at ambient or reduced pressure until the moisture content of the obtained surface-treated magnesium hydroxide-comprising material is in the range from 0.001 to 20 wt.-%, based on the total weight of the surface-treated magnesium hydroxide-comprising material.

The surface-treated magnesium hydroxide-comprising material according to the present invention has a specific surface area (BET) of from 15 to 150 m²/g as measured using nitrogen and the BET method according to ISO 9277:2010 and a moisture pick-up susceptibility of from 0.1 to 10 mg/g, wherein the magnesium hydroxide-comprising material has been treated with at least one surface treatment agent that is a compound according to Formula (I),

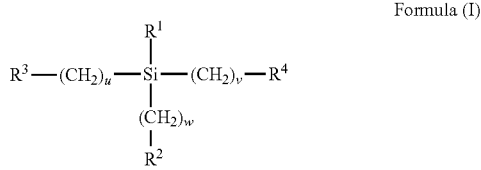

Formula (I)

wherein $R^1$ is a hydrolysable alkoxy group, and $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group, a benzoyl group and a fully or partially halogenated alkyl group having from 1 to 20 carbon atoms, and u, v and w are independently from each other an integer from 0 to 24.

The hydrolysable alkoxy groups of the surface-treatment agent may undergo a chemical reaction with molecules that are located on the surface of the magnesium hydroxide-comprising material. Additionally or alternatively, reaction products of the surface-treatment agent with the water, the pH-adjusting agent, for example, a base and/or the magnesium hydroxide-comprising material may be located on the surface of the surface-treated magnesium-hydroxide-comprising material.

For example, by using the inventive process, it is possible to prepare surface-treated magnesium hydroxide-comprising materials having improved surface characteristics, like a high hydrophobicity or the ability to react with surrounding materials. Furthermore, by using the inventive process, it is possible to prepare surface-treated magnesium hydroxide-comprising material, with a large surface area in combination with a low moisture pick up susceptibility compared to surface-treated magnesium hydroxide-comprising materials prepared by conventional processes.

According to one embodiment of the present invention, the surface-treated magnesium hydroxide-comprising material has a moisture pick-up susceptibility to specific surface area (BET) ratio of 0.001 to 0.5 mg/m Д, preferably from 0.005 to 0.4 mg/m Д, even more preferably from 0.01 to 0.15 mg/m Д, and most preferably from 0.06 to 0.09 mg/m Д. The ratio of moisture pick-up susceptibility to specific surface area (BET) is also known as the 'normalized moisture pickup susceptibility_ of a material and refers to the amount of moisture absorbed on the surface of said material within a certain time upon exposure to a defined humid atmosphere and is expressed in mg/m Д. The precise measurement methods are defined in the examples section.

According to another embodiment of the present invention the surface-treated magnesium hydroxide-comprising material has a weight median particle size $d_{50}$ value in the range from 0.1 ιm to 20 ιm, preferably in the range from 0.25 ιm to 15 ιm, more preferably in the range from 0.5 ιm to 10 ιm and most preferably in the range from 1 ιm to 6 m.

Additionally or alternatively, the surface-treated magnesium hydroxide-comprising material has a top cut ($d_{98}$) of ⩽50 μm, preferably of ⩽30 μm, more preferably of ⩽20 μm and most preferably of ⩽15 μm. Additionally or alternatively, the surface-treated magnesium hydroxide-comprising material has a specific surface area (BET) of from 15 to 150 m²/g as measured using nitrogen and the BET method according to ISO 9277:2010, preferably from 20 to 80 m²/g, and more preferably from 30 to 70 m²/g. Additionally or alternatively, the surface-treated magnesium hydroxide-comprising material has a moisture pick-up susceptibility of from 0.1 to 10 mg/g, preferably from 0.5 to 7 mg/g, and more preferably from 1 to 5 mg/g.

According to one embodiment of the present invention the surface-treated magnesium hydroxide-comprising material has i) a weight median particle size $d_{50}$ value in the range from 0.1 μm to 20 μm, preferably in the range from 0.25 μm to 15 μm, more preferably in the range from 0.5 μm to 10 μm and most preferably in the range from 1 μm to 6 μm and ii) a top cut ($d_{98}$) of ⩽50 μm, preferably of ⩽30 μm, more preferably of ⩽20 μm and most preferably of ⩽15 μm and iii) a specific surface area (BET) of from 15 to 150 m²/g as measured using nitrogen and the BET method according to ISO 9277:2010, preferably from 20 to 80 m²/g, and more preferably from 30 to 70 m²/g and iv) a moisture pick-up susceptibility of from 0.1 to 10 mg/g, preferably from 0.5 to 7 mg/g, and more preferably from 1 to 5 mg/g.

According to one embodiment of the present invention the surface-treated magnesium hydroxide-comprising material has i) a weight median particle size $d_{50}$ value in the range from 0.1 μm to 20 μm, preferably in the range from 0.25 μm to 15 μm, more preferably in the range from 0.5 μm to 10 μm and most preferably in the range from 1 μm to 6 μm or ii) a top cut ($d_{98}$) of ⩽50 μm, preferably of ⩽30 μm, more preferably of ⩽20 μm and most preferably of ⩽15 μm or iii) a specific surface area (BET) of from 15 to 150 m²/g as measured using nitrogen and the BET method according to ISO 9277:2010, preferably from 20 to 80 m²/g, and more preferably from 30 to 70 m²/g or iv) a moisture pick-up susceptibility of from 0.1 to 10 mg/g, preferably from 0.5 to 7 mg/g, and more preferably from 1 to 5 mg/g.

For example, the surface-treated magnesium hydroxide-comprising material has i) a weight median particle size $d_{50}$ value in the range from 0.1 μm to 20 μm, preferably in the range from 0.25 μm to 15 μm, more preferably in the range from 0.5 μm to 10 μm and most preferably in the range from 1 μm to 6 μm and iii) a specific surface area (BET) of from 15 to 150 m²/g as measured using nitrogen and the BET method according to ISO 9277:2010, preferably from 20 to 80 m²/g, and iv) a moisture pick-up susceptibility of from 0.1 to 10 mg/g, preferably from 0.5 to 7 mg/g, and more preferably from 1 to 5 mg/g.

Use of the Surface-Treated Magnesium Hydroxide-Comprising Material

According to the present invention the use of the surface-treated magnesium hydroxide-comprising material in a polymer composition, in paper making, paper coatings, agricultural applications, paints, adhesives, sealants, composite materials, wood composite materials, construction applications, pharma applications and/or cosmetic applications is provided.

According to another embodiment of the present invention the surface-treated magnesium hydroxide-comprising material of the present invention is used in a surrounding material, wherein the surface treatment agent of the surface-treated magnesium hydroxide-comprising material is undergoing a reaction with the surrounding material upon addition of the surface-treated magnesium hydroxide-comprising material into the surrounding material.

The term 'surrounding material_ in the meaning of the present invention refers to a matrix material that comprises the surface-treated magnesium hydroxide-comprising material as filler.

According to one embodiment of the present invention the surrounding material is preferably a polymer formulation, and most preferably a polyolefin formulation, a polyvinylchloride formulation or a polyester formulation and/or the reaction is a crosslinking reaction.

A polyolefin formulation according to the present invention is any of a class of polymers produced from a simple olefin (also called an alkene with the general formula $C_nH_{2n}$) as a monomer. For example, polyethylene is the polyolefin produced by polymerizing the olefin ethylene. Polypropylene is another common polyolefin which is made from the olefin propylene.

A polyvinylchloride (PVC) formulation according to the present invention is a formulation comprising polymers having the following formula —$(CH_2—CHCl)_n$—.

A polyester formulation according to the present invention refers to polymers that contain an ester functional group in their main chain.

A 'crosslinking reaction_ according to the present invention is defined as a reaction between the surrounding material and the surface-treatment agent that is located on the surface of the surface-treated magnesium hydroxide-comprising material. Due to this reaction a bond is created between the surrounding material and the surface-treatment agent that is located on the surface of the surface-treated magnesium hydroxide-comprising material, wherein the bond is a chemical bond or an ionic bond.

As already set out above, the inventors surprisingly found out that the surface-treated magnesium hydroxide-comprising material according to the present invention has a large surface area in combination with a low moisture pickup susceptibility compared to surface-treated magnesium hydroxide-comprising materials prepared by conventional processes.

If the surface-treated magnesium hydroxide-comprising materials of the present invention are used in a final application product such as a polymer composition, in paper making, paper coatings, agricultural applications, paints, adhesives, sealants, composite materials, wood composite materials, construction applications, pharma applications and/or cosmetic applications or is used in a surrounding material, this will lead to an improved quality of the product compared to the same product wherein a surface-treated magnesium hydroxide-comprising material prepared by a conventional process is used. Only the surface of the filler can interact with the surrounding material. Due to the large surface area of the filler an improved interaction of the surface-treated magnesium hydroxide-comprising material according to the present invention with the surrounding material, for example, the polymer or the paper, or the paint/coating is possible.

Furthermore, due to the low moisture pick up susceptibility only less water is incorporated into the polymer composition when the filler is mixed with the surrounding material and, therefore, the processability of the final product can be improved by the minimization of the amount of water added by the filler to the composition.

The scope and interest of the present invention will be better understood based on the following examples which are intended to illustrate certain embodiments of the present invention and are non-limitative.

DESCRIPTION OF THE FIGURES

FIG. 1 shows the evaluation of the: Normalized moisture pickup susceptibility˜ in function of the thermally treated and hydrophobized hydromagnesite, using surface treatment agents No. 1, No. 2 or No. 3

FIG. 2 shows the SEM pictures of 1) Fresh hydromagnesite without surface treatment agent FIG. 3 shows the SEM pictures of 2) surface-treated magnesium hydroxide comprising material treated with surface treatment agent No. 1

FIG. 4 shows the SEM pictures of 3) surface-treated magnesium hydroxide comprising material treated with surface treatment agent No. 2

FIG. 5 shows the SEM pictures of 4) surface-treated magnesium hydroxide comprising material treated with surface treatment agent No. 3

FIG. 6 shows the BET values (m²/g) of the magnesium carbonate-comprising material before and after calcining at different thermal treatment temperatures (éC) between 100 éC and 900 éC. Thevalue at '0_ mean that this sample is a freshly prepared sample at room temperature.

FIG. 7 shows the correlation of the employed amount of surface treatment agent vs. the normalized water pickup in examples 8 to 13

EXAMPLES

1. Measurement Methods

In the following, the measurement methods implemented in the examples are described.

Humidity of Fresh Hydromagnesite

A 10 g powder sample was heated in an oven at 150 éC until the mass is constant for 15 min. The mass loss has been determined gravimetrically and is expressed as wt. % loss based on the initial sample mass. This mass loss has been attributed to the sample humidity.

Particle Size Distribution (Mass % Particles with a Diameter <X) and Weight Median Diameter ($d_{50}$) of a Particulate Material Weight median grain diameter and grain diameter mass distribution of a particulate material were determined using Malvern Mastersizer 3000. T his device determines the size of powders and slurries within the range of 0.1 to 900 ≈m by means of laser diffraction. The analysed materials were measured in solid phase, by Aero S. For that purpose, a ca. 2 poly-spoons of dry sample is introduced into the Aero S through the corresponding sieve. The processes and instruments are known to the skilled person and are commonly used to determine grain size of fillers and pigments.

Specific Surface Area BET

The specific surface area is measured via the BET method according to ISO 9277:2010 using nitrogen, following conditioning of the sample by heating at 100 éC for a period of 60 min After performing the thermal treatment of the non-upgraded pigment, the sample was directly stored in a bottom-flask containing an inert atmosphere ($N_2$) to prevent contact with air.

pH Measurements

The pH of a suspension is measured at 25 éC using a Mettler Toledo Seven Easy pH meter and a Mettler Toledo InLab⁺ Expert Pro pH electrode. A three point calibration (according to the segment method) of the instrument is first made using commercially available buffer solutions having pH values of 4, 7 and 10 at 20 éC (from Aldrich). The reported pH values are the endpoint values detected by the instrument (the endpoint is when the measured signal differs by less than 0.1 mV from the average over the last 6 s).

XRD Method

Samples were analysed with a Bruker D8 Advance powder diffractometer obeying Bragg˜s law. This diffractometer consists of a 2.2 kW X-ray tube, a sample holder, a J-J goniometer, and a $V_t$ NTEC-1 detector. Nickel-filtered Cu Kα radiation was employed in all experiments. The profiles were chart recorded automatically using a scan speed of 0.125 é per second in 2J (XRD GV_7600). The resulting powder diffraction pattern can easily be classified by mineral content using the DIFFRAC$^{suite}$ software packages EVA and SEARCH, based on reference patterns of the ICDD PDF 2 database (XRD LTM_7603). Quantitative analysis of diffraction data refers to the determination of amounts of different phases in a multi-phase sample and has been performed using the DIFFRAC suite software package TOPAS (XRD LTM_7604). In detail, quantitative analysis allows to determine structural characteristics and phase proportions with quantifiable numerical precision from the experimental data itself. This involves modelling the full diffraction pattern (Rietveld approach) such that the calculated pattern(s) duplicates the experimental one. The Rietveld method requires knowledge of the approximate crystal structure of all phases of interest in the pattern. However, the use of the whole pattern rather than a few select lines produces accuracy and precision much better than any single-peak-intensity based method.

Moisture Pick Up Susceptibility

The moisture pickup susceptibility of a material as referred to herein, is determined in mg moisture/g of solid, after exposure to an atmosphere of 10 and 85% relative humidity, respectively, for 2 hours at a temperature of +23 éC (ĕ 2 éC). For this purpose, the sample is first kept at an atmosphere of 10% relative humidity for 2 hours, then the atmosphere is changed to 85% relative humidity at which the sample is kept for another 2 hours, finally the atmosphere is changed to 10% of humidity for 30 minutes.

The weight increase is then used to calculate the moisture pick-up in mg moisture/g of sample.

The moisture pick up susceptibility in mg/g divided by the specific surface area in m²/g (calculated based on the specific surface area BET) corresponds to the 'normalized moisture pick up susceptibility_ expressed in mg/m² of sample.

Scanning Electron Microscope (SEM)

The prepared samples were examined by a Sigma VP field emission scanning electron microscope (Carl Zeiss AG, Germany) and a variable pressure secondary electron detector (VPSE) and/or secondary electron detector (SE) with a chamber pressure of about 50 Pa.

2. Starting Materials
2.1. Surface Treatment Agents

TABLE 1

Surface treatment agents

| Surface treatment agent number | Name | Supplier | Properties |
|---|---|---|---|
| (1) | n-Octadecyltriethoxy-silane (CAS: 7399-00-0) | Gelest order number SIO6642.0 | Purity >95%; Refractive Index: 1.4386; Melting Point: 10-12°C; Flash Point: <150°C |
| (2) | 1H,1H,2H,2H-Perfluorodecyltriethoxy-silane 97% (CAS: 101947-16-4) | Sigma-Aldrich order number CDS010752-250 mg | Purity: 97%; Refractive Index: 1.342; Boiling Point: 209-230°C; Flash Point: >110°C |
| (3) | 1H,1H,2H,2H-Perfluorooctyltriethoxy-silane (CAS: 51851-37-7) | Aldrich order number MK BX 9419V | Purity: 98%; Refractive Index: 1.344; Flash Point: 97°C |

2.2. Mineral Pigments

TABLE 2

Mineral pigment

| Chemical nature | BET surface [m²/g] | Moisture pick up susceptibility (mg/g) | Normalized moisture pick up susceptibility (mg/m²) | $d_{50}$ [μm] | Humidity [wt.-%] |
|---|---|---|---|---|---|
| Hydromagnesite (Used abbreviation in the text: HMG) | 62.07 | 57.46 | 0.92 | 5.26 | 3.51 |

3. Experiments

Example 1 (Comparative)

8 g of fresh HMG (dried at 100 °C overnight) was putted in a 250 mL beaker, then 54 g of distilled water was added. The slurry was heated up-to 90 °C, the system was kept under reflux to prevent the evaporation of the used solvent. In parallel, 0.34 g of the surface treatment agent No. 1, corresponding to a 0.0056 g/m², was added in a 50 mL container to 3.20 g of Ethanol/H₂O mixture of 1-to-1 ratio. The latter solution was heated up to 70 °C, then 530 μL of a 10 wt.-% solution of KOH was added, the mixture was kept for 6 minutes. Finally, the solution containing the surface treatment agent No. 1 was added to the slurry and left under mixing for 30 minutes. The upgraded slurry was next filtrated under vacuum using cellulose based filters of (Whatman Rundfilter Art. Nr. 9060202, Ø 90 mm, 589/2 No. 1 & 2). The filter cake was dried overnight at 110 °C, then deagglomerated manually using a mortar and a pestle.

Example 2 (Comparative)

8 g of fresh HMG (dried at 100 °C overnight) was thermally treated at 300 °C for 2 hours, then putted in a 250 mL beaker with 54 g of distilled water. The slurry was heated up-to 90 °C, the system was kept under reflux to prevent the evaporation of the used solvent. In parallel, 0.40 g of the surface treatment agent No. 1, corresponding to a 0.0056 g/m², was added in a 50 mL container to 3.70 g of Ethanol/H₂O mixture of 1-to-1 ratio. The latter solution was heated up to 70 °C, then 615 μL of a 10 wt.-% solution of KOH was added, the mixture was kept for 6 minutes. Finally, the solution containing the surface treatment agent No. 1 was added to the slurry and left under mixing for 30 min. The upgraded slurry was next filtrated under vacuum using cellulose based filters of (Whatman Rundfilter Art. Nr. 9060202, Ø 90 mm, 589/2 No. 1 & 2). The filter cake was dried overnight at 110 °C, then deagglomerated manually using a mortar and a pestle.

Example 3 (Comparative)

8 g of fresh HMG (dried at 100 °C overnight) was thermally treated at 400 °C for 2 hours, then putted in a 250 mL beaker with 54 g of distilled water. The slurry was heated up-to 90 °C, the system was kept under reflux to prevent the evaporation of the used solvent. In parallel, 1.62 g of the surface treatment agent No. 1, corresponding to a 0.0056 g/m², was added in a 50 mL container to 14.70 g of Ethanol/H₂O mixture of 1-to-1 ratio. The latter solution was heated up to 70 °C, then 2.47 mL of a 10 wt.-% solution of KOH was added, the mixture was kept for 6 minutes. Finally, the solution containing the surface treatment agent No. 1 was added to the slurry and left under mixing for 30 min. The upgraded slurry was next filtrated under vacuum using cellulose based filters of (Whatman Rundfilter Art. Nr. 9060202, Ø 90 mm, 589/2 No. 1 & 2). The filter cake was dried overnight at 110 °C, then deagglomerated manually using a mortar and a pestle.

Example 4 (Inventive)

8 g of fresh HMG (dried at 100 °C overnight) was thermally treated at 600 °C for 2 hours, then putted in a 250 mL beaker with 54 g of distilled water. The slurry was heated up-to 90 °C, the system was kept under reflux to prevent the evaporation of the used solvent. In parallel, 0.68 g of the surface treatment agent No. 1, corresponding to a 0.0056 g/m², was added in a 50 mL container to 6.30 g of Ethanol/H₂O mixture of 1-to-1 ratio. The latter solution was heated up to 70 °C, then 1.05 mL of a 10 wt.-% solution of KOH was added, the mixture was kept for 6 minutes. Finally, the solution containing the surface treatment agent No. 1 was added to the slurry and left under mixing for 30 min. The upgraded slurry was next filtrated under vacuum using cellulose based filters of (Whatman Rundfilter Art. Nr. 9060202, Ø 90 mm, 589/2 No. 1 & 2). The filter cake was dried overnight at 110 °C, then deagglomerated manually using a mortar and a pestle.

Example 5 (Comparative)

8 g of fresh HMG (dried at 100 °C overnight) was thermally treated at 900 °C for 2 hours, then putted in a 250 mL beaker with 54 g of distilled water. The slurry was heated up-to 90 °C, the system was kept under reflux to prevent the evaporation of the used solvent. In parallel, 0.23 g of the surface treatment agent No. 1, corresponding to a 0.0056 g/m², was added in a 50 mL container to 2.10 g of Ethanol/H₂O mixture of 1-to-1 ratio. The latter solution was heated up to 70 °C, then 350 μL of a 10 wt.-% solution of KOH was added, the mixture was kept for 6 min. Finally, the solution containing the surface treatment agent No. 1 was added to the slurry and left under mixing for 30 min. The upgraded slurry was next filtrated under vacuum using cellulose based filters of (Whatman Rundfilter Art. Nr. 9060202, Ø 90 mm, 589/2 No. 1 & 2). The filter cake was dried overnight at 110 °C, then deagglomerated manually using a mortar and a pestle.

Example 6 (Inventive)

8 g of fresh HMG (dried at 100 °C overnight) was thermally treated at 600 °C for 2 hours, then putted in a 250 mL beaker with 54 g of distilled water. The slurry was heated up-to 90 °C, the system was kept under reflux to prevent the evaporation of the used solvent. In parallel, 1.02 g of the surface treatment agent No. 2, corresponding to an iso-molar value of the surface treatment agent No. 1 in the Example 4, was added in a 50 mL container to 9.33 g of Ethanol/$H_2O$ mixture of 1-to-1 ratio. The latter solution was heated up to 70 °C, then 480 μL of a 10 wt.-% solution of KOH was added, the mixture was kept for 6 min. Finally, the solution containing the surface treatment agent No. 2 was added to the slurry and left under mixing for 30 min. The upgraded slurry was next filtrated under vacuum using cellulose based filters of (Whatman Rundfilter Art. Nr. 9060202, Ø 90 mm, 589/2 No. 1 & 2). The filter cake was dried overnight at 110 °C, then deagglomerated manually using a mortar and a pestle.

Example 7 (Inventive)

8 g of fresh HMG (dried at 100 °C overnight) was thermally treated at 600 °C for 2 hours, then putted in a 250 mL beaker with 54 g of distilled water. The slurry was heated up-to 90 °C, the system was kept under reflux to prevent the evaporation of the used solvent. In parallel, 0.87 g of the surface treatment agent No. 3, corresponding to an iso-molar value of the surface treatment agent No. 1 in the Example 4, was added in a 50 mL container to 7.96 g of Ethanol/$H_2O$ mixture of 1-to-1 ratio. The latter solution was heated up to 70 °C, then 480 μL of a 10 wt.-% solution of KOH was added, the mixture was kept for 6 min. Finally, the solution containing the surface treatment agent No. 2 was added to the slurry and left under mixing for 30 min. The upgraded slurry was next filtrated under vacuum using cellulose based filters of (Whatman Rundfilter Art. Nr. 9060202, Ø 90 mm, 589/2 No. 1 & 2). The filter cake was dried overnight at 110 °C, then deagglomerated manually using a mortar and a pestle.

Example 8 (Comparative)

8 g of fresh HMG (dried at 100 °C overnight) was thermally treated at 600 °C for 2 hours, then putted in a 250 mL beaker with 54 g of distilled water. The slurry was heated up-to 90 °C, the system was kept under reflux to prevent the evaporation of the used solvent. Finally, the slurry was filtrated under vacuum using cellulose based filters of (Whatman Rundfilter Art. Nr. 9060202, Ø 90 mm, 589/2 No. 1 & 2). The filter cake was dried overnight at 110 °C, then deagglomerated manually using a mortar and a pestle.

Example 9 (Comparative)

8 g of fresh HMG (dried at 100 °C overnight) was thermally treated at 600 °C for 2 hours, then putted in a 250 mL beaker with 54 g of distilled water. The slurry was heated up-to 90 °C, the system was kept under reflux to prevent the evaporation of the used solvent. In parallel, 0.11 g of the surface treatment agent No. 1, corresponding to a 0.09 mg/$m^2$, was added in a 50 mL container to 1.1 g of Ethanol/$H_2O$ mixture of 1-to-1 ratio. The latter solution was heated up to 70 °C, then 17.6 μL of a 10 wt.-% solution of KOH was added, the mixture was kept for 6 minutes. Finally, the solution containing the surface treatment agent No. 1 was added to the slurry and left under mixing for 30 min. The upgraded slurry was next filtrated under vacuum using cellulose based filters of (Whatman Rundfilter Art. Nr. 9060202, Ø 90 mm, 589/2 No. 1 & 2). The filter cake was dried overnight at 110 °C, then deagglomerated manually using a mortar and a pestle.

Example 10 (Comparative)

8 g of fresh HMG (dried at 100 °C overnight) was thermally treated at 600 °C for 2 hours, then putted in a 250 mL beaker with 54 g of distilled water. The slurry was heated up-to 90 °C, the system was kept under reflux to prevent the evaporation of the used solvent. In parallel, 0.13 g of the surface treatment agent No. 1, corresponding to a 0.11 mg/$m^2$, was added in a 50 mL container to 1.1 g of Ethanol/$H_2O$ mixture of 1-to-1 ratio. The latter solution was heated up to 70 °C, then 17.6 μL of a 10 wt.-% solution of KOH was added, the mixture was kept for 6 minutes. Finally, the solution containing the surface treatment agent No. 1 was added to the slurry and left under mixing for 30 min. The upgraded slurry was next filtrated under vacuum using cellulose based filters of (Whatman Rundfilter Art. Nr. 9060202, Ø 90 mm, 589/2 No. 1 & 2). The filter cake was dried overnight at 110 °C, then deagglomerated manually using a mortar and a pestle.

Example 11 (Comparative)

8 g of fresh HMG (dried at 100 °C overnight) was thermally treated at 600 °C for 2 hours, then putted in a 250 mL beaker with 54 g of distilled water. The slurry was heated up-to 90 °C, the system was kept under reflux to prevent the evaporation of the used solvent. In parallel, 0.23 g of the surface treatment agent No. 1, corresponding to a 1.99 mg/$m^2$, was added in a 50 mL container to 2.1 g of Ethanol/$H_2O$ mixture of 1-to-1 ratio. The latter solution was heated up to 70 °C, then 350 μL of a 10 wt.-% solution of KOH was added, the mixture was kept for 6 minutes. Finally, the solution containing the surface treatment agent No. 1 was added to the slurry and left under mixing for 30 min. The upgraded slurry was next filtrated under vacuum using cellulose based filters of (Whatman Rundfilter Art. Nr. 9060202, Ø 90 mm, 589/2 No. 1 & 2). The filter cake was dried overnight at 110 °C, then deagglomerated manually using a mortar and a pestle.

Example 12 (Comparative)

8 g of fresh HMG (dried at 100 °C overnight) was thermally treated at 600 ° for 2 hours, then putted in a 250 mL beaker with 54 g of distilled water. The slurry was heated up-to 90 °C, the system was kept under reflux to prevent the evaporation of the used solvent. In parallel, 0.92 g of the surface treatment agent No. 1, corresponding to a 7.99 mg/$m^2$, was added in a 50 mL container to 8.4 g of Ethanol/$H_2O$ mixture of 1-to-1 ratio. The latter solution was heated up to 70 °C, then 1410 μL of a 10 wt.-% solution of KOH was added, the mixture was kept for 6 minutes.

Finally, the solution containing the surface treatment agent No. 1 was added to the slurry and left under mixing for 30 min. The upgraded slurry was next filtrated under vacuum using cellulose based filters of (Whatman Rundfilter Art. Nr. 9060202, ⌀ 90 mm, 589/2 No. 1 & 2). The filter cake was dried overnight at 110 °C, then deagglomerated manually using a mortar and a pestle.

Example 13 (Comparative)

8 g of fresh HMG (dried at 100 °C overnight) was thermally treated at 600 °C for 2 hours, then putted in a 250 mL beaker with 54 g of distilled water. The slurry was heated up-to 90 °C, the system was kept under reflux to prevent the evaporation of the used solvent. In parallel, 2.07 g of the surface treatment agent No. 1, corresponding to a 17.99 mg/m$^2$, was added in a 50 mL container to 18.9 g of Ethanol/H$_2$O mixture of 1-to-1 ratio. The latter solution was heated up to 70 °C, then 3170 μL of a 10 wt.-% solution of KOH was added, the mixture was kept for 6 minutes. Finally, the solution containing the surface treatment agent No. 1 was added to the slurry and left under mixing for 30 min. The upgraded slurry was next filtrated under vacuum using cellulose based filters of (Whatman Rundfilter Art. Nr. 9060202, ⌀ 90 mm, 589/2 No. 1 & 2). The filter cake was dried overnight at 110 °C, then deagglomerated manually using a mortar and a pestle.

TABLE 4-continued

Concentration of the surface treatment agent in ethanol/water mixture in the examples.

| Example | Surface treatment agent [g] | Ethanol/Water [g] | concentration |
|---|---|---|---|
| 11 | 0.23 | 2.1 | 0.11 |
| 12 | 0.92 | 8.4 | 0.11 |
| 13 | 2.07 | 18.9 | 0.11 |

As can be seen from table 4 in all the examples nearly the same concentration of surface treatment agent in ethanol/water mixture has been used.

The data of examples 4, 6 and 7 (Table 3) show that the surface-treated magnesium hydroxide comprising material has a large surface area in combination with a low moisture pick up susceptibility when the process according to the present invention is used.

As can be seen in Table 3 as well as from FIG. 1 the surface-treated magnesium hydroxide-comprising materials that have been prepared by the inventive process have a normalized moisture pick up susceptibility of between 0.061 to 0.09 m㎡. Contrary to that, surface-treated magnesium hydroxide-comprising materials that have been prepared with the same surface treatment agent than used in example 4 but have been calcined at temperatures below 450 °C or above 750 °C have much higher normalized moisture pickup susceptibilities of between 0.25 to 1.15 m㎡.

TABLE 3

Summary and results.

| Example | Mineral pigment | Thermal treatment temperature (T° C.) for 2 hours | Surface treatment agent No. | Surface treatment agent dosage $^{a)}$ | Base for hydrolysing surface treatment agent | BET of the surface treated HMG (m$^2$/g) | Moisture pick up susceptibility (mg/g) | Normalized Moisture pick up susceptibility (mg/m$^2$) | d$_{50}$ (μm) |
|---|---|---|---|---|---|---|---|---|---|
| 1 (comparative) | HMG | — | 1 | 5.6 | KOH | 52.39 | 45.13 | 0.86 | 5.26 |
| 2 (comparative) | HMG | 300 | 1 | 5.6 | KOH | 63.96 | 57.32 | 0.89 | — |
| 3 (comparative) | HMG | 400 | 1 | 5.6 | KOH | 57.08 | 66.08 | 1.15 | — |
| 4 (inventive) | HMG | 600 | 1 | 5.6 | KOH | 36.90 | 3.60 | 0.09 | 3.75 |
| 5 (comparative) | HMG | 900 | 1 | 5.6 | KOH | 19.15 | 4.98 | 0.25 | — |
| 6 (inventive) | HMG | 600 | 2 | —$^{b)}$ | KOH | 41.53 | 3.01 | 0.072 | 4.59 |
| 7 (inventive) | HMG | 600 | 3 | —$^{b)}$ | KOH | 52.49 | 3.22 | 0.061 | 1.98 |
| 8 (Comparative) | HMG | 600 | — | — | — | 60.50 | 32.19 | 0.53 | — |
| 9 (Comparative) | HMG | 600 | 1 | 0.09 | KOH | 68.43 | 30.71 | 0.448 | |
| 10 (Comparative) | HMG | 600 | 1 | 0.11 | KOH | 41.62 | 18.36 | 0.441 | |
| 11 (Comparative) | HMG | 600 | 1 | 1.99 | KOH | 56.11 | 18.03 | 0.32 | |
| 12 (Comparative) | HMG | 600 | 1 | 7.99 | KOH | 52.46 | 8.84 | 0.17 | |
| 13 (Comparative) | HMG | 600 | 1 | 17.99 | KOH | 26.11 | 13.75 | 0.52 | |

$^{a)}$ Ratio: 'Surface treatment agent (mg)/BET of the thermally treated but non-upgraded HMG (m$^2$/g)';
$^{b)}$ The amount of surface treatment agent No. 2 and No. 3 was calculated based on an iso-molar value calculated from the Example 4.

TABLE 4

Concentration of the surface treatment agent in ethanol/water mixture in the examples.

| Example | Surface treatment agent [g] | Ethanol/Water [g] | concentration |
|---|---|---|---|
| 1 | 0.34 | 3.2 | 0.11 |
| 2 | 0.4 | 3.7 | 0.11 |
| 3 | 1.62 | 14.7 | 0.11 |
| 4 | 0.68 | 6.3 | 0.11 |
| 5 | 0.23 | 2.1 | 0.11 |
| 6 | 1.02 | 9.33 | 0.11 |
| 7 | 0.87 | 7.96 | 0.11 |
| 9 | 0.11 | 1.1 | 0.10 |
| 10 | 0.13 | 1.1 | 0.12 |

Therefore, it has been shown that it is possible to prepare a surface-treated magnesium hydroxide-comprising material by the inventive process that has a large surface area in combination with a low moisture pick up susceptibility.

The invention claimed is:

1. A surface-treated magnesium hydroxide-comprising material having a weight median particle size d$_{50}$ value in the range from 0.25 μm to 15 μm,
wherein the magnesium hydroxide-comprising material has been treated with at least one surface treatment agent that is a compound according to Formula (I),

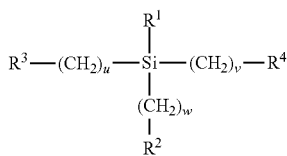

Formula (I)

wherein $R^1$ is a hydrolysable alkoxy group, and $R^2$, $R^3$ and $R^4$ are independently from each other selected from the group consisting of hydrogen, a hydroxyl group, an alkyl group, a vinyl group, an alkoxy group, an acyloxy group, an acryloxy group, a methacryloxy group, an ethacryloxy group, a carboxyl group, an epoxy group, an anhydride group, an ester group, an aldehyde group, an amino group, an ureido group, an azide group, a halogen group, a phosphonate group, a phosphine group, a sulphonate group, a sulphide group or disulphide group, an isocyanate group or masked isocyanate group, a thiol group, a phenyl group, a benzyl group, a styryl group, a benzoyl group and a fully or partially halogenated alkyl group having from 1 to 20 carbon atoms, and u, v and w are independently from each other an integer from 0 to 24, and wherein the surface-treated magnesium hydroxide-comprising material has a specific surface area (BET) of from 15 to 150 $m^2/g$ as measured using nitrogen and the BET method according to ISO 9277:2010, a moisture pick-up susceptibility of from 0.1 to 10 mg/g, and a moisture pick-up susceptibility to specific surface area (BET) ratio of 0.001 to 0.5 mg/$m^2$;

and wherein the moisture content of the surface-treated magnesium hydroxide-comprising material is in the range from 0.05 to 5 wt.-% based on the total weight of the surface-treated magnesium hydroxide-comprising material.

2. A surface-treated magnesium hydroxide-comprising material according to claim 1, having a moisture pick-up susceptibility to specific surface area (BET) ratio of from 0.06 to 0.09 mg/$m^2$.

3. The surface-treated magnesium hydroxide-comprising material according to claim 1 wherein the at least one surface-treatment agent is selected from the group consisting of triethoxyvinyl silane, trim ethoxyvinyl silane, n-octadecyltriethoxysilane,1H,1H,2H,2H-perfluorodecyltriethoxysilane or 1H,1H,2H,2H-perfluorooctyltriethoxysilane and combinations thereof.

4. The surface-treated magnesium hydroxide-comprising material according to claim 1 wherein the weight median particle size $d_{50}$ value is in the range from 1 μm to 6 μm.

5. A polymer composition comprising the surface-treated magnesium hydroxide-comprising material according to claim 1.

6. The surface-treated magnesium hydroxide-comprising material according to claim 1 wherein the weight median particle size $d_{50}$ value is in the range from 0.5 μm to 10 μm.

7. The surface-treated magnesium hydroxide-comprising material according to claim 1 wherein the surface-treated magnesium hydroxide-comprising material has a specific surface area (BET) of from 20 to 80 $m^2/g$ as measured using nitrogen and the BET method according to ISO 9277:2010.

8. The surface-treated magnesium hydroxide-comprising material according to claim 1 wherein the surface-treated magnesium hydroxide-comprising material has a specific surface area (BET) of from 30 to 70 $m^2/g$ as measured using nitrogen and the BET method according to ISO 9277:2010.

9. The surface-treated magnesium hydroxide-comprising material according to claim 1 wherein the surface-treated magnesium hydroxide-comprising material has a moisture pick-up susceptibility of from 0.5 to 7 mg/g.

10. The surface-treated magnesium hydroxide-comprising material according to claim 1 wherein the surface-treated magnesium hydroxide-comprising material has a moisture pick-up susceptibility of from 1 to 5 mg/g.

11. A surface-treated magnesium hydroxide-comprising material according to claim 1, wherein the surface-treated magnesium hydroxide-comprising material has a moisture pick-up susceptibility to specific surface area (BET) ratio of from 0.005 to 0.4 mg/$m^2$.

12. A surface-treated magnesium hydroxide-comprising material according to claim 1, wherein the surface-treated magnesium hydroxide-comprising material has a moisture pick-up susceptibility to specific surface area (BET) ratio of from 0.01 to 0.15 mg/$m^2$.

13. The surface-treated magnesium hydroxide-comprising material according to claim 1 wherein the moisture content of the surface-treated magnesium hydroxide-comprising material is in the range from 0.06 to 1 wt.-% based on the total weight of the surface-treated magnesium hydroxide-comprising material.

14. The surface-treated magnesium hydroxide-comprising material according to claim 1 wherein the surface-treated magnesium hydroxide-comprising material has a top cut ($d_{98}$) of <50 μm.

15. The surface-treated magnesium hydroxide-comprising material according to claim 1 wherein the surface-treated magnesium hydroxide-comprising material has a top cut ($d_{98}$) of <15 μm.

* * * * *

UNITED STATES PATENT AND TRADEMARK OFFICE
CERTIFICATE OF CORRECTION

PATENT NO. : 11,975,984 B2
APPLICATION NO. : 17/058354
DATED : May 7, 2024
INVENTOR(S) : Ippolito et al.

It is certified that error appears in the above-identified patent and that said Letters Patent is hereby corrected as shown below:

In the Claims

Column 41, Line 44: Claim 3, Delete "triethoxyvinyl silane, trim ethoxyvinylsilane," and insert -- triethoxyvinylsilane, trimethoxyvinylsilane, --

Signed and Sealed this
Eleventh Day of June, 2024

Katherine Kelly Vidal
*Director of the United States Patent and Trademark Office*